US012453667B2

(12) United States Patent
Bartley et al.

(10) Patent No.: US 12,453,667 B2
(45) Date of Patent: Oct. 28, 2025

(54) LIFT SYSTEMS AND LOAD CELLS FOR PATIENT SUPPORT APPARATUS

(71) Applicant: Stryker Corporation, Kalamazoo, MI (US)

(72) Inventors: Gary L. Bartley, Kalamazoo, MI (US); William D. Childs, Plainwell, MI (US); Connor F. St. John, Kalamazoo, MI (US); Anish Paul, Kalamazoo, MI (US); Brian J. Tessmer, Mattawan, MI (US)

(73) Assignee: Stryker Corporation, Portage, MI (US)

( * ) Notice: Subject to any disclaimer, the term of this patent is extended or adjusted under 35 U.S.C. 154(b) by 418 days.

(21) Appl. No.: 17/915,163

(22) PCT Filed: May 27, 2021

(86) PCT No.: PCT/US2021/034393
§ 371 (c)(1),
(2) Date: Sep. 28, 2022

(87) PCT Pub. No.: WO2021/242946
PCT Pub. Date: Dec. 2, 2021

(65) Prior Publication Data

US 2023/0338213 A1 Oct. 26, 2023

Related U.S. Application Data

(60) Provisional application No. 63/030,478, filed on May 27, 2020.

(51) Int. Cl.
*A61G 7/05* (2006.01)
*A61G 7/005* (2006.01)
(Continued)

(52) U.S. Cl.
CPC ............ *A61G 7/0527* (2016.11); *A61G 7/005* (2013.01); *A61G 7/012* (2013.01); *A61G 7/018* (2013.01); *A61G 2203/44* (2013.01)

(58) Field of Classification Search
CPC .. A61G 7/0527; A61G 7/005; A61G 2203/44; G01L 1/2225
See application file for complete search history.

(56) References Cited

U.S. PATENT DOCUMENTS

| | | | | |
|---|---|---|---|---|
| 4,420,985 A * | 12/1983 | Raskin | ................. | G01L 1/2225 73/862.633 |
| 4,478,093 A | 10/1984 | Valadier | | |

(Continued)

FOREIGN PATENT DOCUMENTS

| | | |
|---|---|---|
| JP | 6637715 B2 | 1/2020 |
| JP | 6768915 B2 | 10/2020 |
| KR | 200317904 Y1 * | 6/2003 |

OTHER PUBLICATIONS

English language abstract and machine-assisted English translation for JP 6637715 B2 extracted from espacenet.com database on Nov. 28, 2022, 13 pages.

(Continued)

*Primary Examiner* — Eric J Kurilla
(74) *Attorney, Agent, or Firm* — Howard & Howard Attorneys PLLC

(57) ABSTRACT

A patient support apparatus includes a base and a support frame. A lift system operates to lift and lower the support frame relative to the base. The lift system includes a first lift and a second lift. The first lift and the second lift are independently operable to place the support frame in one or more Trendelenburg positions. A plurality of load cells acts between the lifts and the support frame such that a load on the support frame is transmitted to the plurality of load cells to measure the load. The first lift includes a guided body
(Continued)

arranged to move longitudinally relative to the base in response to operation of the second lift to move the support frame to the one or more Trendelenburg positions.

19 Claims, 28 Drawing Sheets

(51) Int. Cl.
*A61G 7/012* (2006.01)
*A61G 7/018* (2006.01)

(56) References Cited

U.S. PATENT DOCUMENTS

| | | | | | |
|---|---|---|---|---|---|
| 4,576,053 | A * | 3/1986 | Hatamura | E02F 9/26 73/862.631 |
| 5,419,210 | A * | 5/1995 | Haker | G01L 1/2225 73/862.631 |
| 6,470,759 | B1 | 10/2002 | Scott | |
| 6,820,294 | B2 | 11/2004 | Shiery et al. | |
| 7,241,956 | B1 | 7/2007 | Stimpson | |
| 7,395,564 | B2 | 7/2008 | McDaniel et al. | |
| 7,472,439 | B2 | 1/2009 | Lemire et al. | |
| 7,784,363 | B2 | 8/2010 | Ihrke et al. | |
| 7,926,131 | B2 * | 4/2011 | Menkedick | A61G 7/015 5/613 |
| 8,024,980 | B2 | 9/2011 | Arms et al. | |
| 8,069,514 | B2 | 12/2011 | Poulos et al. | |
| 10,716,722 | B2 * | 7/2020 | Roussy | A61G 7/0512 |
| 2002/0066142 | A1 * | 6/2002 | Osborne | A61G 7/0507 5/617 |
| 2003/0090383 | A1 * | 5/2003 | Conway | G08B 21/0461 340/665 |
| 2005/0028281 | A1 | 2/2005 | Ooyama et al. | |
| 2006/0059814 | A1 * | 3/2006 | Metz | G01G 19/445 52/309.8 |
| 2007/0107531 | A1 * | 5/2007 | Munz | G01L 1/005 73/849 |
| 2014/0237721 | A1 | 8/2014 | Lemire et al. | |
| 2015/0300872 | A1 | 10/2015 | Hirose et al. | |
| 2016/0081592 | A1 * | 3/2016 | Ishikawa | G01G 19/445 5/600 |
| 2016/0128610 | A1 | 5/2016 | Kostic et al. | |
| 2017/0143566 | A1 * | 5/2017 | Elku | A61G 7/0512 |
| 2017/0246065 | A1 * | 8/2017 | Connell | A61G 1/04 |
| 2018/0098900 | A1 * | 4/2018 | Sato | A61G 7/0527 |
| 2018/0235822 | A1 * | 8/2018 | Wako | G01L 1/2225 |
| 2018/0303687 | A1 | 10/2018 | Moreno et al. | |
| 2018/0360681 | A1 * | 12/2018 | Paul | A61G 7/012 |
| 2019/0008708 | A1 | 1/2019 | Moreno et al. | |
| 2019/0159949 | A1 | 5/2019 | Johnson et al. | |
| 2019/0250026 | A1 * | 8/2019 | Miyawaki | G01G 19/52 |
| 2020/0060907 | A1 | 2/2020 | Childs et al. | |
| 2021/0030611 | A1 * | 2/2021 | Shiery | A61G 7/0527 |
| 2021/0177679 | A1 | 6/2021 | St. John et al. | |
| 2022/0409460 | A1 * | 12/2022 | Cerny | G01G 21/23 |
| 2024/0299225 | A1 * | 9/2024 | Sukumaran | A61G 7/018 |

OTHER PUBLICATIONS

English language abstract and machine-assisted English translation for JP 6768915 B2 extracted from espacenet.com database on Nov. 28, 2022, 12 pages.

International Search Report for Application No. PCT/US2021/034393 dated Sep. 21, 2021, 1 page.

* cited by examiner

LIFT SYSTEMS AND LOAD CELLS FOR PATIENT SUPPORT APPARATUS

CROSS-REFERENCE TO RELATED APPLICATIONS

The subject patent application claims priority to and all the benefits of U.S. Provisional Patent Application No. 63/030,478, filed on May 27, 2020, the entire contents and disclosure of which is hereby incorporated by reference in its entirety.

BACKGROUND

A patient support apparatus, such as a hospital bed, facilitates care of patients in a health care setting. A conventional patient support apparatus includes a base, a support frame upon which the patient is supported, a lift system for lifting and lowering the support frame relative to the base, and a plurality of load cells for measuring the patient's weight or for detecting the patient's position or movement. Sometimes, it is desirable for the lift system to be capable of placing the patient in one or more Trendelenburg positions. However, depending on the arrangement of the load cells, measurements taken in the one or more Trendelenburg positions may be less accurate than desired.

SUMMARY

The present disclosure provides a patient support apparatus including a support structure with a base, a support frame, and a patient support deck, the support frame extending longitudinally from a first longitudinal end to a second longitudinal end and the base having a guide. A first lift is provided to lift or lower the first longitudinal end of the support frame relative to the base. The first lift has a guided body movable longitudinally relative to the base along the guide. A second lift is provided to lift or lower the second longitudinal end of the support frame relative to the base. The first lift and the second lift being are operable to place the support frame in one or more Trendelenburg positions in which the first longitudinal end and the second longitudinal end are at different heights relative to the base. The patient support apparatus further includes a plurality of load cells, with at least one load cell coupled to the first lift to act between the first lift and the support frame, and with at least one load cell coupled to the second lift to act between the second lift and the support frame, such that a load on the support frame is transmitted to the plurality of load cells to measure the load. The guided body is arranged to move longitudinally relative to the base in response to operation of the second lift to move the support frame to the one or more Trendelenburg positions such that the first lift moves longitudinally toward the second lift to accommodate movement of the support frame to the one or more Trendelenburg positions.

The present disclosure also provides a load cell including an elongate body extending longitudinally along a longitudinal axis from a mounting portion to a load application portion. The load application portion defines a pair of side openings and a pivot shaft passage extending between the side openings, with a load application region located midway through the pivot shaft passage. Each of the pair of side openings has a first diameter, and the pivot shaft passage has a second diameter at the load application region, the second diameter being smaller than the first diameter.

DETAILED DESCRIPTION

Figure 1:
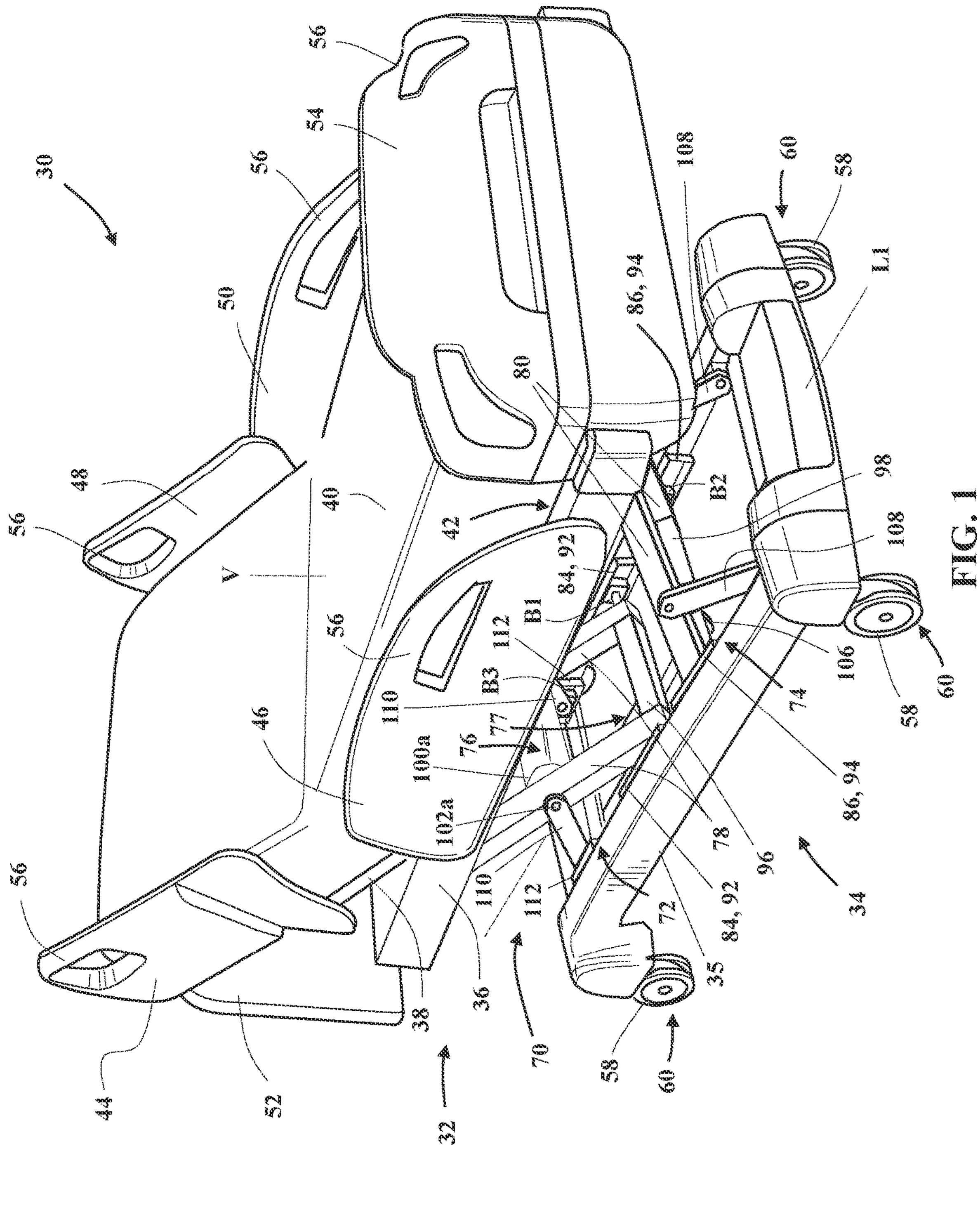
FIG. 1 is perspective view of a patient support apparatus.

Referring to FIG. 1, a patient support apparatus 30 is shown for supporting a patient in a health care setting. The patient support apparatus 30 illustrated in FIG. 1 is a hospital bed. In other versions, however, the patient support apparatus 30 may be a stretcher, cot, table, wheelchair, or similar apparatus utilized in the care of a patient.

A support structure 32 provides support for the patient. The support structure 32 illustrated in FIG. 1 includes a base 34 and a support frame 36. The base 34 includes a base frame 35. The support frame 36 is spaced above the base frame 35 in FIG. 1. The support structure 32 also includes a patient support deck 38 disposed on the support frame 36. The patient support deck 38 includes several sections, some of which are capable of articulating (e.g., pivoting) relative to the support frame 36, such as a fowler section, a seat section, a thigh section, and a foot section. The patient support deck 38 provides a patient support surface 42 upon which the patient is supported.

A mattress 40 is disposed on the patient support deck 38 during use. The mattress 40 includes a secondary patient support surface upon which the patient is supported. The base 34, support frame 36, patient support deck 38, and patient support surface 42 each have a head end and a foot end corresponding to designated placement of the patient's head and feet on the patient support apparatus 30. The head end and the foot end may also be referred to as opposing longitudinal ends. The base 34 includes a longitudinal axis L1 along its length from the head end to the foot end. The base 34 also includes a vertical axis V arranged crosswise (e.g., perpendicularly) to the longitudinal axis L1 along which the support frame 36 is lifted and lowered relative to the base 34. The construction of the support structure 32 may take on any known or conventional design and is not limited to that specifically set forth above. In addition, the mattress 40 may be omitted in certain versions, such that the patient rests directly on the patient support surface 42.

Side rails 44, 46, 48, 50 are coupled to the support structure 32. A first side rail 44 is positioned at a right head end of the patient support deck 38. A second side rail 46 is positioned at a right foot end of the support frame 36. A third side rail 48 is positioned at a left head end of the patient support deck 38. A fourth side rail 50 is positioned at a left foot end of the support frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to such ingress and egress. In some configurations, the patient support apparatus 30 may not include any side rails.

A headboard 52 and a footboard 54 are coupled to the support frame 36. In some versions, when the headboard 52 and footboard 54 are included, the headboard 52 and footboard 54 may be coupled to other locations on the patient support apparatus 30, such as the base 34. In some versions, the patient support apparatus 30 does not include the headboard 52 and/or the footboard 54.

Caregiver interfaces 56, such as handles, are shown integrated into the footboard 54 and side rails 44, 46, 48, 50 to facilitate movement of the patient support apparatus 30 over floor surfaces. Additional caregiver interfaces 56 may be integrated into the headboard 52 and/or other components of the patient support apparatus 30. The caregiver interfaces 56 are graspable by the caregiver to manipulate the patient support apparatus 30 for movement.

Wheels 58 are coupled to the base 34 to facilitate transport over the floor surfaces. The wheels 58 are arranged in each of four quadrants of the base 34 adjacent to corners of the base 34. In the version shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some versions, the wheels 58 are not caster wheels and may be non-steerable, steerable, non-powered, powered, or combinations thereof. Additional wheels are also contemplated. For example, the patient support apparatus 30 may include four non-powered, non-steerable wheels, along with one or more powered wheels. In some cases, the patient support apparatus 30 may not include any wheels. In some versions, one or more auxiliary wheels (powered or non-powered), which are movable between stowed positions and deployed positions, may be coupled to the support structure 32.

Figure 3:
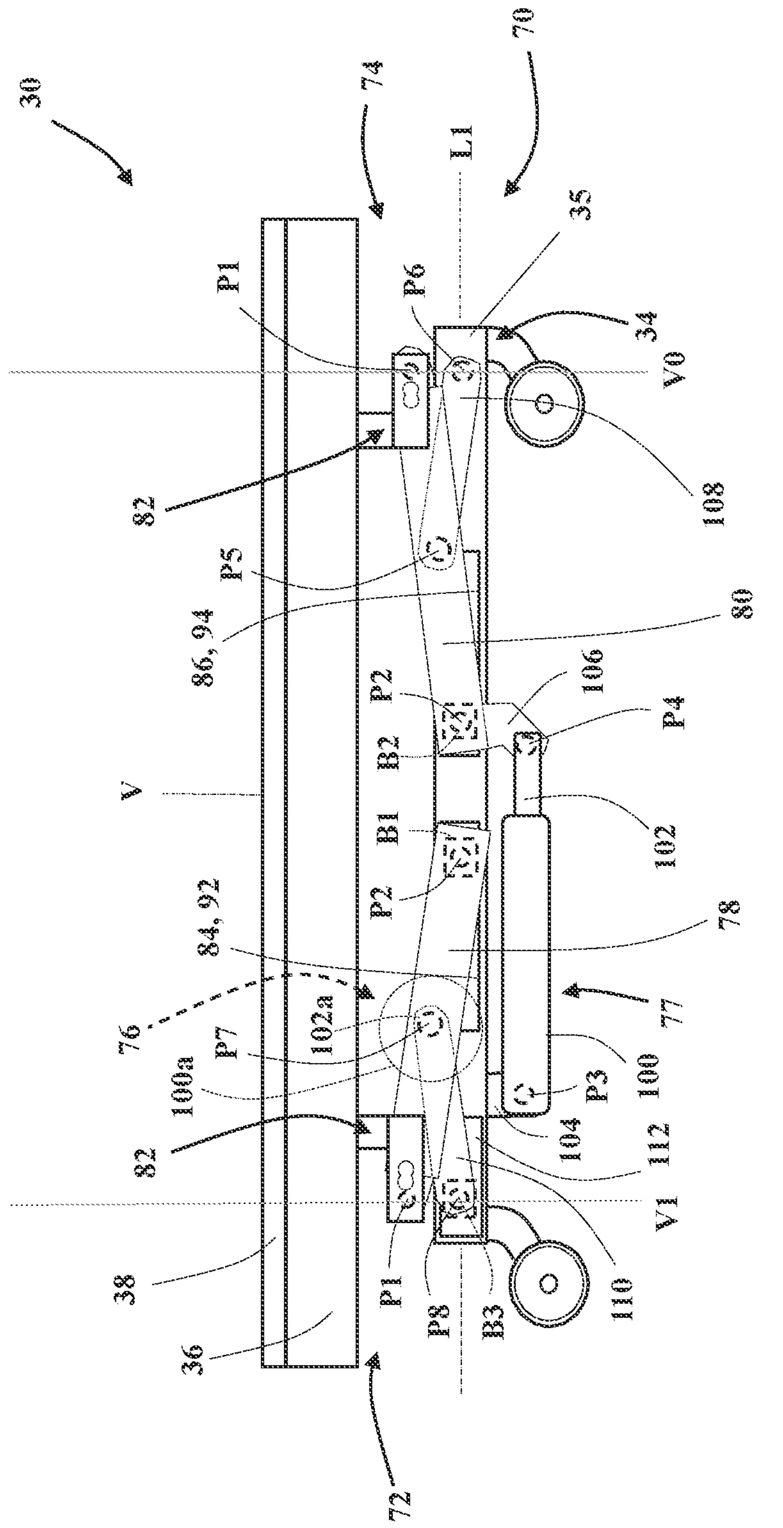
FIG. 3 is an elevational and schematic view of the patient support apparatus of FIG. 1 with the support frame lowered to a second height relative to the base.
Figure 4A:
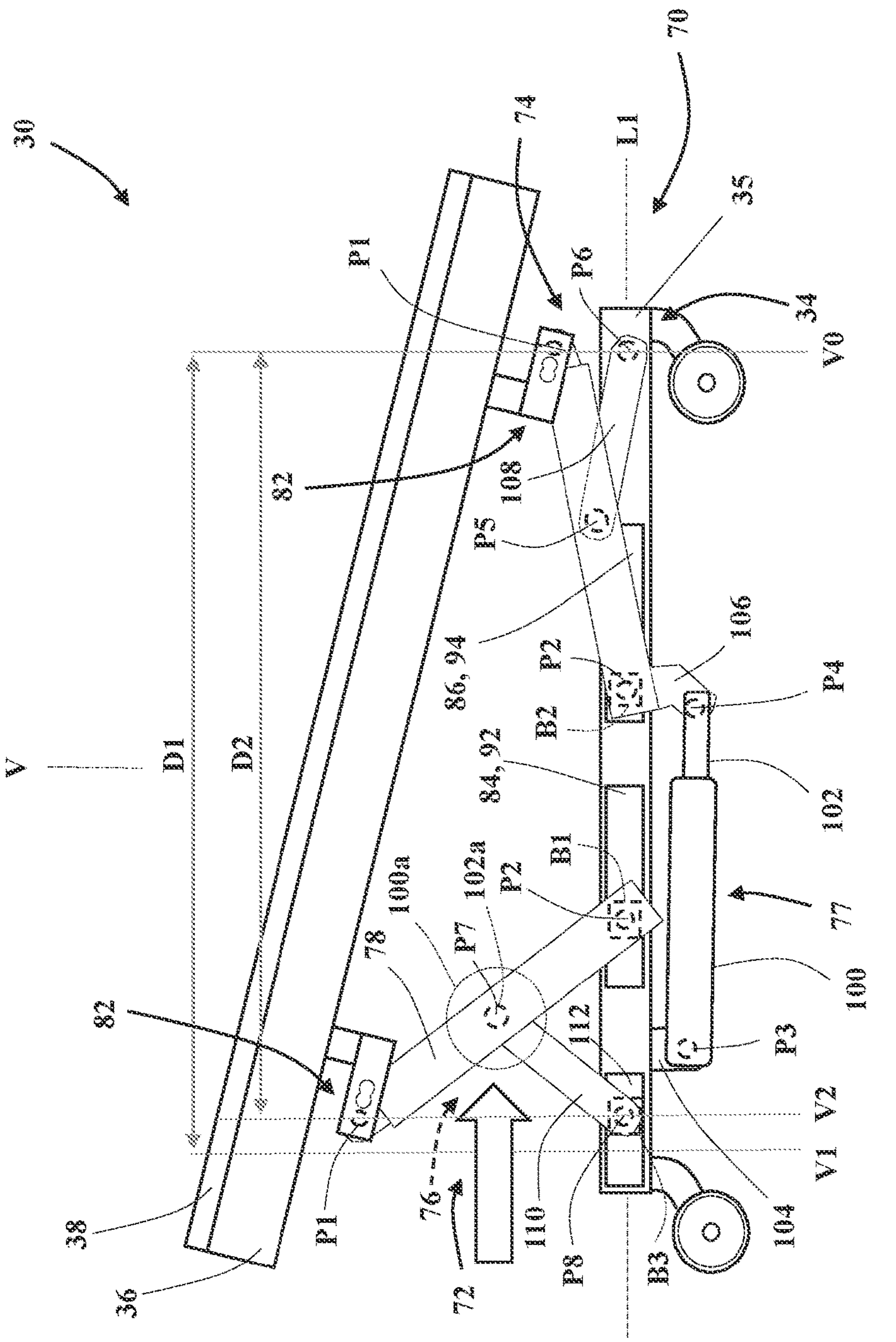
FIG. 4A is an elevational and schematic view of the patient support apparatus of FIG. 1 with the support frame in a Trendelenburg position.
Figure 4B:
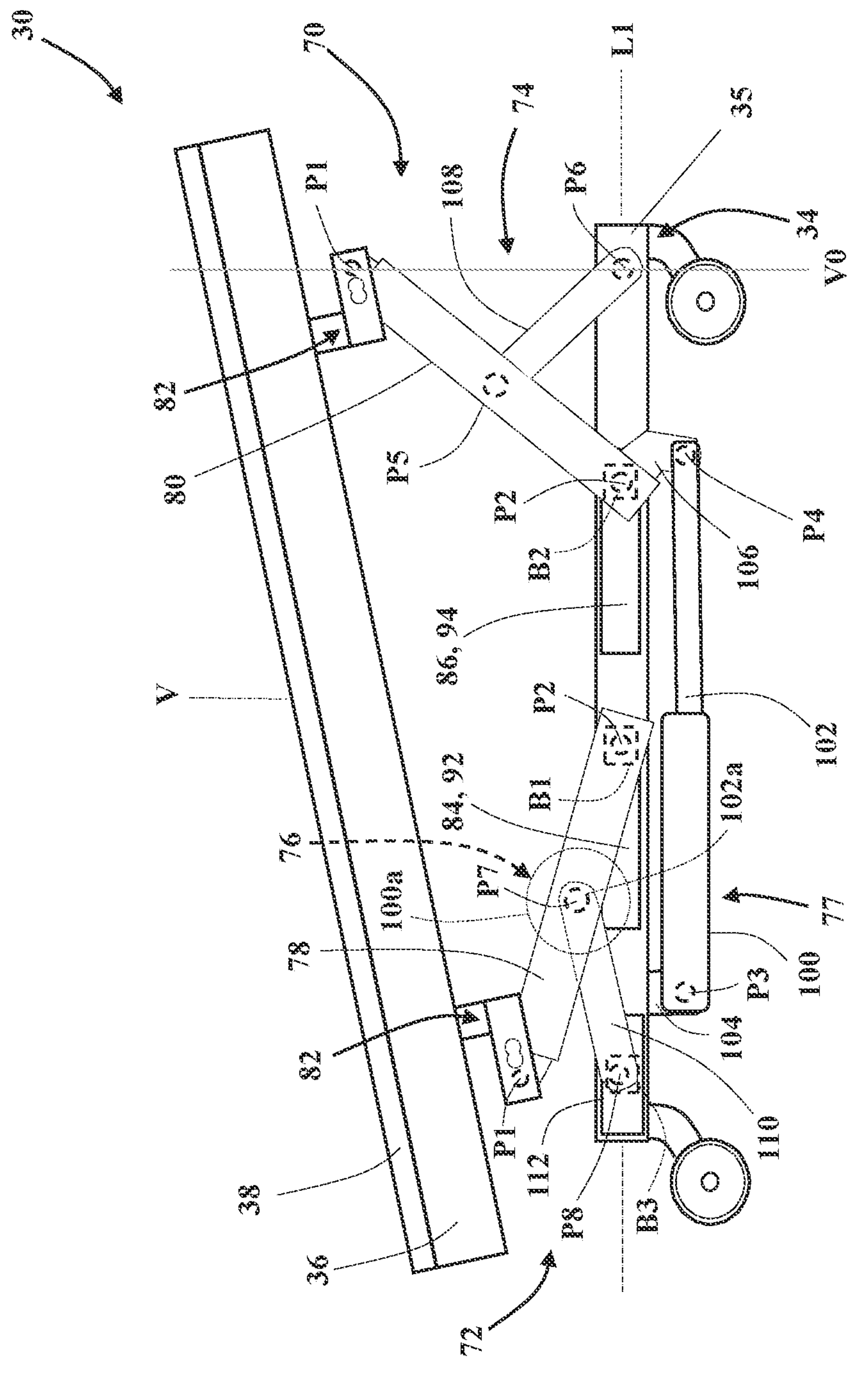
FIG. 4B is an elevational and schematic view of the patient support apparatus of FIG. 1 with the support frame in another Trendelenburg position.

The patient support apparatus 30 includes a lift system 70 that operates to lift and lower the support frame 36 and the patient support deck 38 relative to the base 34. The lift system 70 is configured to move the support frame 36 from a first height (shown in FIG. 2) to a second, lower height (shown in FIG. 3), or to any desired position in between. The lift system 70 includes a head end lift 72 and a foot end lift 74. The head end lift 72 is arranged to lift or lower the head end of the support frame 36 relative to the base 34. The foot end lift 74 is arranged to lift or lower the foot end of the support frame 36 relative to the base 34. Each of the head end lift 72 and the foot end lift 74 includes an actuator 76, 77 to actuate the lifts 72, 74. The lifts 72, 74 are separately and independently operable such that the support frame 36 and the patient support deck 38 can be placed in one or more Trendelenburg positions in which the head end and the foot end are at different heights relative to the base 34, as shown in FIGS. 4A and 4B.

The lifts 72, 74 may be identical in form or may have different forms. For instance, one of the lifts may be a crank-type mechanism or scissor-type mechanism, while the other of the lifts may be a column lift. The head end lift 72 and the foot end lift 74 may be interchangeable such that the head end lift 72 is at the foot end of the patient support apparatus 30 and the foot end lift 74 is at the head end of the patient support apparatus 30. FIGS. 2 through 4B are elevational and schematic views that illustrate the lifts 72, 74 and their operation. The mattress 40, side rails 44, 46, 48, 50, headboard 52, and footboard 54 have been removed in FIGS. 2 through 4B for illustration purposes.

Figure 5:
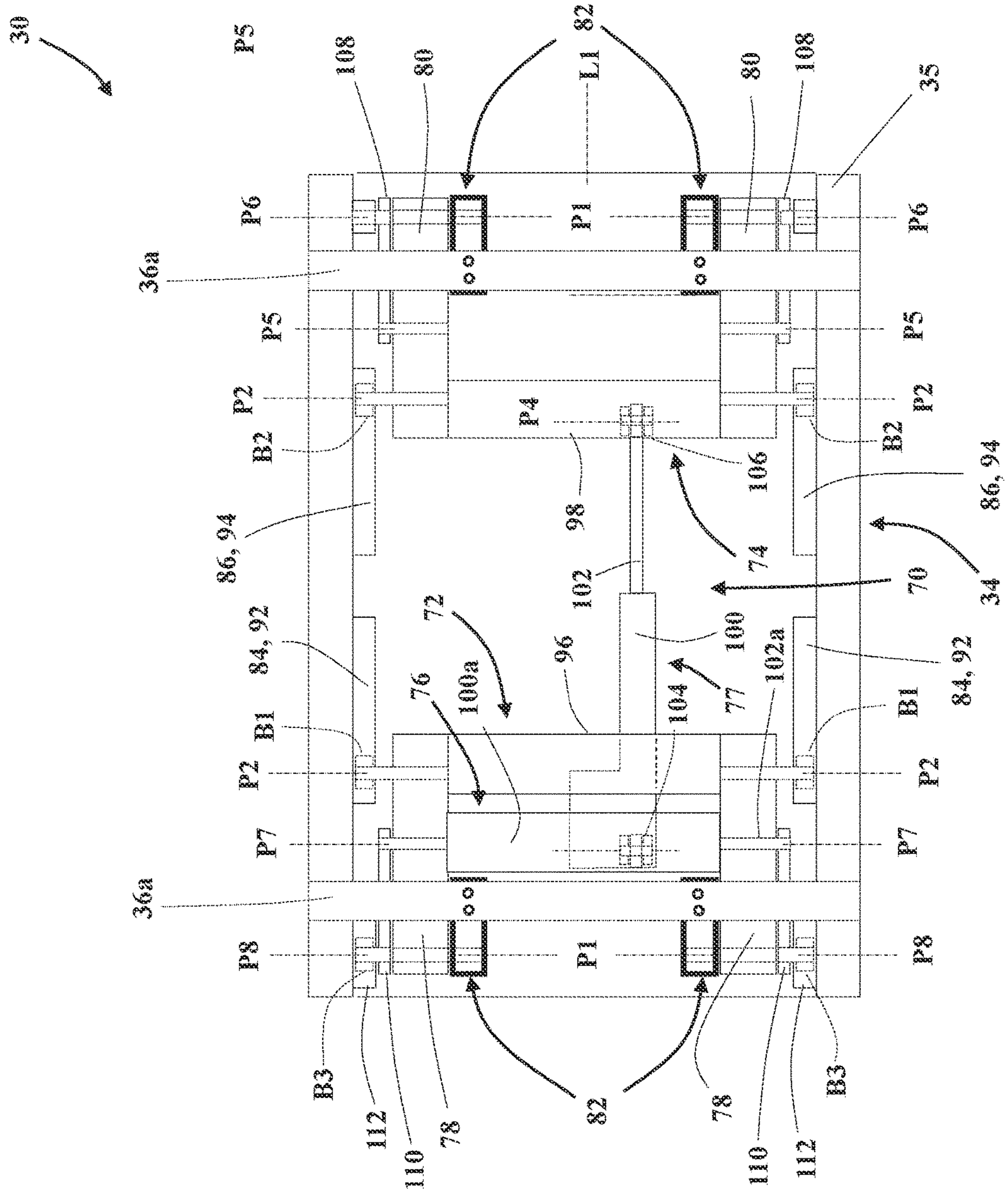
FIG. 5 is a top and schematic view of the patient support apparatus of FIG. 1 illustrating portions of the support frame, a lift system, the load cells, and the base.

The head end lift 72 includes one or more head end legs 78 and the foot end lift 74 includes one or more foot end legs 80. In the version shown, there are two, laterally spaced, head end legs 78 and two, laterally spaced, foot end legs 80. Since FIGS. 2 through 4B are elevational and schematic views, only one head end leg 78 and one foot end leg 80 are shown for ease of illustration. The other head end leg 78 and foot end leg 80 and their connections are the same as those shown, but on the opposite side of the base frame 35 (i.e., only one, interior side of the base frame 35 is shown in FIGS. 2 through 4B). The head end legs 78 and the foot end legs 80 are similarly arranged, yet in opposing directions. All of the legs 78, 80 can be seen in FIGS. 1 and 5.

Referring specifically to FIGS. 2 through 4B, each of the legs 78, 80 extends at an acute angle (relative to the longitudinal axis L1) from a first end pivotally coupled to a load cell 82 to a second end pivotally and slidably coupled to the base 34. More specifically, the first ends are pivotally connected to the load cells 82 at upper pivot axes P1 and the second ends are pivotally connected to the base frame 35 at lower pivot axes P2. The load cells 82 have mounting portions fixed to the support frame 36, as will be described further below (see, e.g., FIG. 17).

The load cells 82 coupled to the head end legs 78 (could be only one is some versions) act between the head end lift 72 and the support frame 36. The load cells 82 coupled to the foot end legs 80 (could be only one in some versions) act between the foot end lift 74 and the support frame 36. Pivot connections between the legs 78, 80 and the load cells 82 and/or between the legs 78, 80 and the base frame 35 may be formed using any suitable brackets, pivot pins, pivot shafts, or any other suitable pivot connections. The legs 78, 80 are operably coupled to their respective actuators 76, 77 to be moved by their respective actuators 76, 77 to pivot relative to the load cells 82 about the upper pivot axes P1 and to pivot relative to the base 34 about the lower pivot axes P2. In some versions, the lifts 72, 74 may each include a single leg. In some versions, other types of lifting members capable of lifting and lowering the support frame 36 may be employed.

Each of the lifts 72, 74 includes guided bodies B1, B2 that are pivotally connected to the second ends of the legs 78, 80 via the pivot connections about the lower pivot axes P2. One guided body B1, B2 is provided for each leg 78, 80 (only two guided bodies B1, B2 can be seen in FIGS. 2 through 4B). In the version shown, the guided bodies B1, B2 include blocks formed of low friction materials, such as polytetrafluoroethylene (PTFE), to limit friction as the blocks translate relative to the base 34. The blocks can be any shape, including box-shaped, spherical, cylindrical, or the like. In some versions, the guided bodies include rollers, pins, shafts, gears, or other movable elements that move longitudinally.

The base 34 includes a pair of head end guides 84 and a pair of foot end guides 86 fixed to the base frame 35 to receive the guided bodies B1, B2 (again, only two guides can be seen in FIGS. 2 through 4B). The guided bodies B1, B2 are configured to translate longitudinally in the guides 84, 86 during operation of the lifts 72, 74. Owing to the pivot connections of the guided bodies B1, B2 to the legs 78, 80, the guides 84, 86 thereby act to guide translational movement of the second ends of the legs 78, 80 during operation (compare FIGS. 2 and 3). The head end guides 84 guide movement of the guided bodies B1 pivotally connected to the head end legs 78. The foot end guides 86 guide movement of the guided bodies B2 pivotally connected to the foot end legs 80.

The head end guides 84 include head end guide tracks 92 and the foot end guides 86 include foot end guide tracks 94. The guide tracks 92, 94 are shaped to receive the guided bodies B1, B2. The guide tracks 92, 94 are fixed to the base frame 35 and have an elongated shape. In particular, the guide tracks 92, 94 are shown as rectangular boxes having openings facing inwardly from the base frame 35. The guide tracks 92, 94 have upper and lower walls W to vertically constrain the guided bodies B1, B2 to limit their motion to sliding within the guide tracks 92, 94. In some versions, the guide tracks 92, 94 may have flanges extending from the upper and lower walls W to capture the guided bodies B1, B2 in the guide tracks 92, 94 and prevent lateral withdrawal from the guide tracks 92, 94. In the version shown, the guide tracks 92, 94 are arranged horizontally, but other arrangements are also contemplated. The guide tracks 92, 94 may be arcuate in shape, linear, combinations thereof, and the like. The guide tracks 92, 94 may be shaped and/or arranged to facilitate both longitudinal and vertical movement of the guided bodies B1, B2. The guide tracks 92, 94 are slide-bearing guide tracks in which the blocks slide and may similarly be formed or coated with low friction materials, such as metal coated with PTFE and/or other low friction material.

Figure 2:
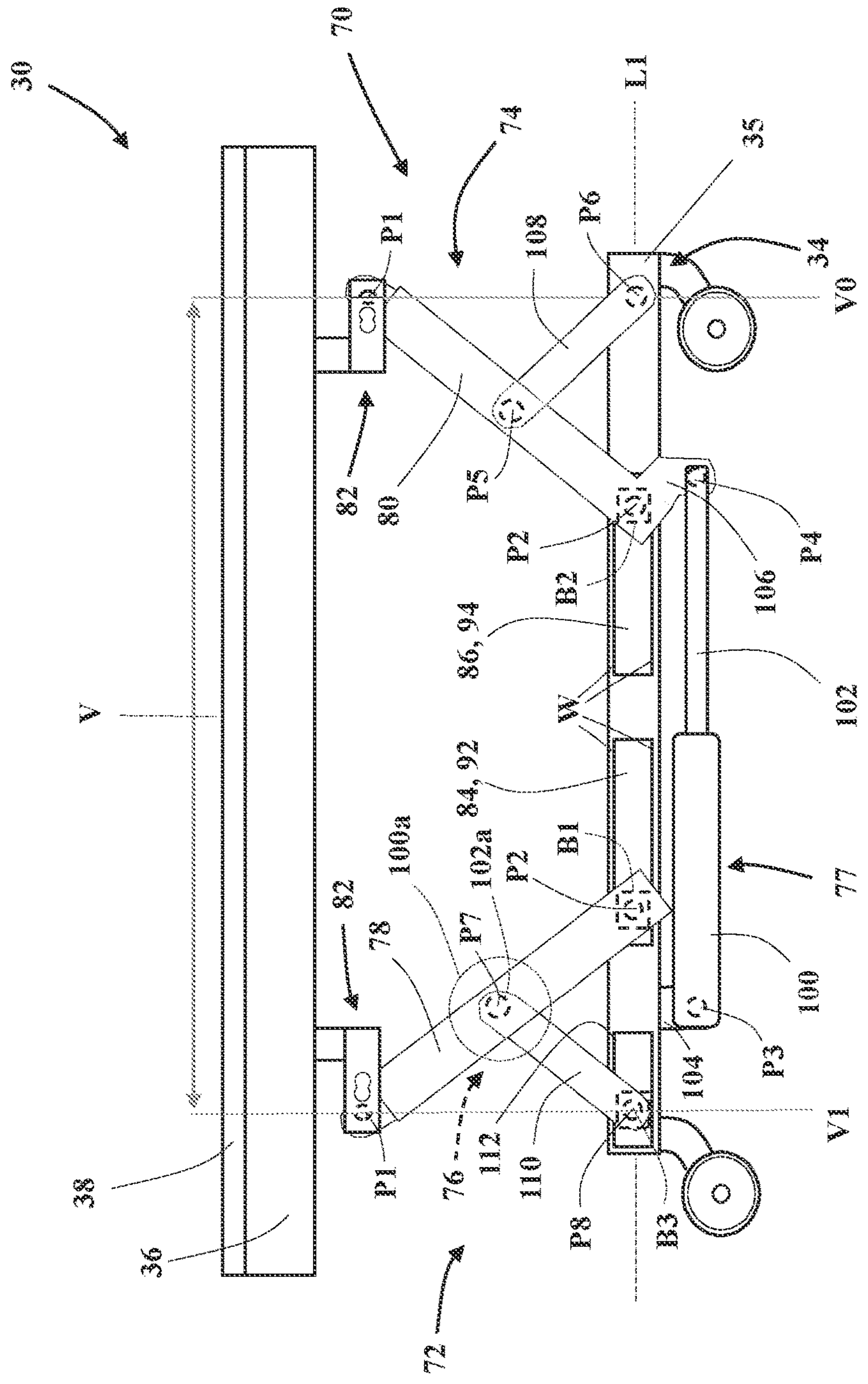
FIG. 2 is an elevational and schematic view of the patient support apparatus of FIG. 1 with a support frame at a first height relative to a base.
Figure 5A:
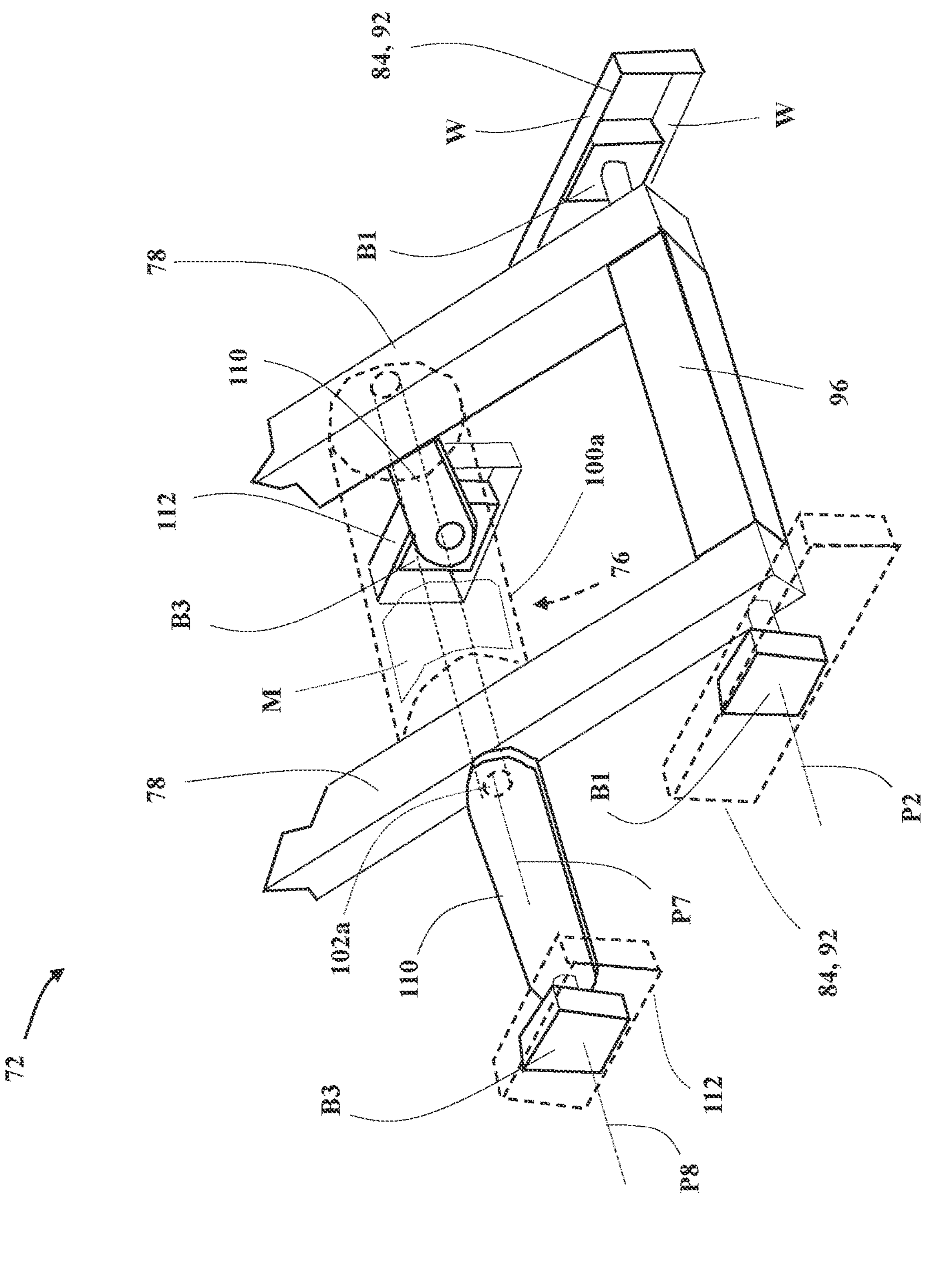
FIG. 5A is a close-up view of a lift of the patient support apparatus of FIG. 1.

Referring specifically to FIG. 2, the legs 78, 80 pivot relative to their respective guided bodies B1, B2 when the guided bodies B1, B2 move longitudinally in the guide tracks 92, 94. Thus, the legs 78, 80 are pivotally and slidably coupled to the base frame 35. The guide tracks 92, 94 and the legs 78, 80 are arranged so that the guided bodies B1 move toward the guided bodies B2 as the support frame 36 is lowered relative to the base 34 and move away from each other as the support frame 36 is lifted relative to the base 34 (compare FIGS. 2 and 3). In some versions, the guide tracks 92, 94 and the legs 78, 80 may be arranged such that the motion of the guided bodies B1, B2 during lifting and lowering is reversed. The guide tracks 92 and the guided bodies B1 associated with the head end legs 78 are best shown in FIG. 5A—the guide tracks 94 and the guided bodies B2 associated with the foot end legs 80 may be similar in shape, size, and arrangement with respect to the foot end legs 80.

The actuators 76, 77 may be placed at any suitable location to actuate the lifts 72, 74. In the version shown in FIGS. 1 through 5A, the actuator 76 is a rotary actuator that has a housing 100*a* fixed to the head end legs 78 and a rotating shaft 102*a* fixed to at least one of a pair of links 110, described further below. The rotating shaft 102*a* may be fixed to both of the links 110 through the housing 100*a*. The housing 100*a* contains a motor M (see FIG. 5A) and gear train operable to rotate the rotating shaft 102*a* about pivot axis P7. The rotating shaft 102*a* rotates relative to the housing 100*a* to rotate the links 110 relative to the head end legs 78. Alternatively, the housing 100*a* could be fixed to the links 110 and the rotating shaft 102*a* fixed to the head end legs 78. Other suitable locations for the rotary actuator are possible.

Figure 5B:
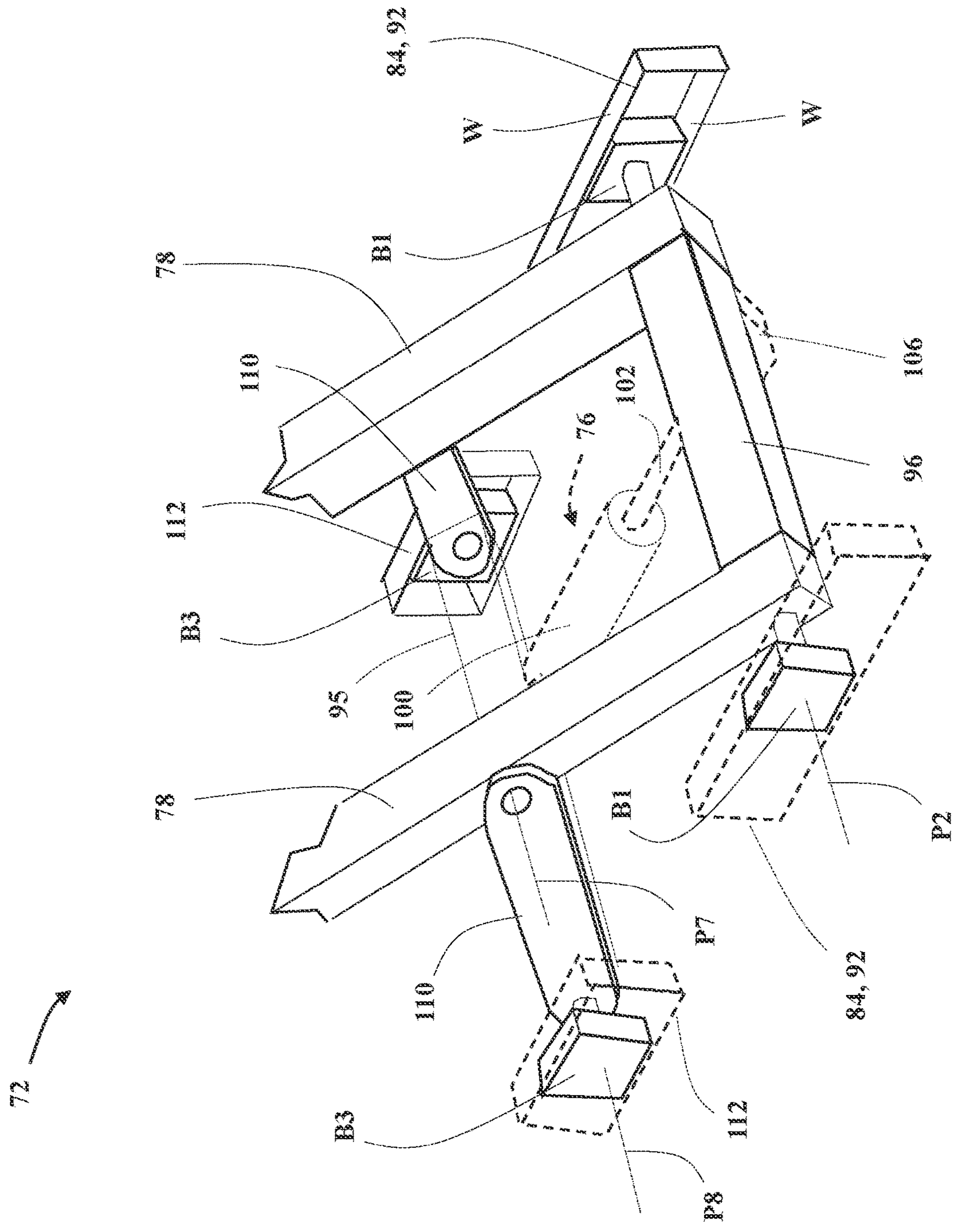
FIG. 5B is a close-up view of a lift of the patient support apparatus of FIG. 1 with an alternative actuator.
Figure 5C:
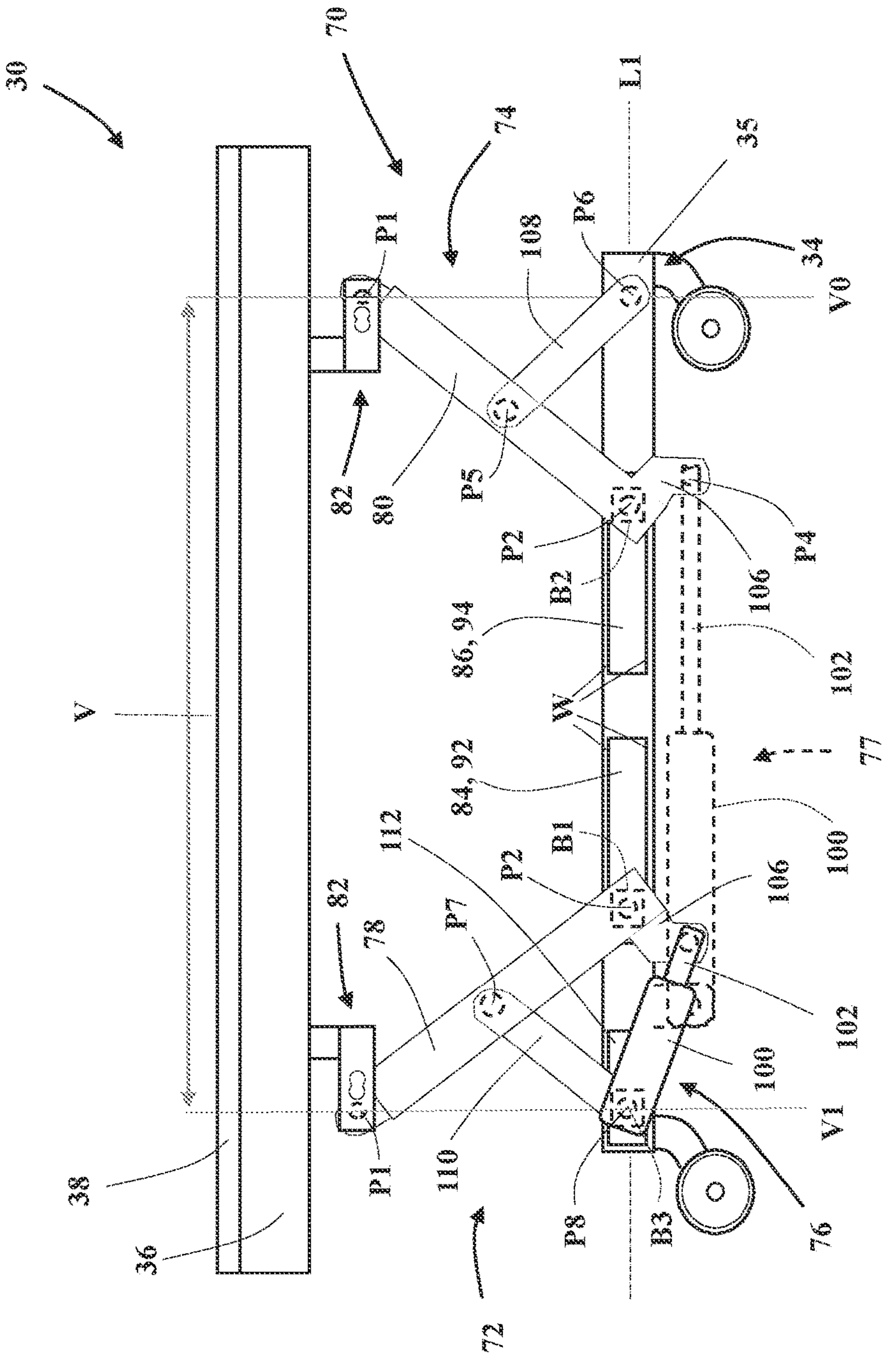
FIG. 5C is an elevational and schematic view of the patient support apparatus of FIG. 1 with the alternative actuator of FIG. 5B.

The actuator 76 could also be located as shown in FIGS. 5B and 5C, to operate between the head end legs 78 and the links 110. In this version, a first end of the actuator 76 is pivotally connected to the links 110, e.g., directly to one of the links 110 or to a bracket of a cross member 95 (see FIG. 5B) fixed to and extending between the links 110. A second end of the actuator 76 is pivotally connected to the head end legs 78, e.g., directly to one of the head end legs 78 or to a bracket 106 of a head end support member 96 (see FIG. 5B) fixed to and extending between the head end legs 78. In this version, the actuator 76 is a linear actuator that includes a housing 100 and a drive rod 102 that extends and retracts relative to the housing 100 to rotate the links 110 relative to the head end legs 78. The housing 100 and drive rod 102 may be pivotally connected to the links 110 and the legs 78 via brackets and pivot pins, pivot shafts, or any other suitable pivot connections.

In the various versions shown, the actuator 76 is arranged without any connections to the base 34 or to the support frame 36. In the versions shown, the first lift 72 is a free-standing lift. During movement to a Trendelenburg position, as described further below, the first lift 72 slides longitudinally relative to the second lift 74. As a result, the actuator 76 also slides longitudinally, including both the housing 100*a,* 100 and the rotating shaft/drive rod 102*a*, 102 sliding toward the second lift 74.

Referring back to FIG. 2, the actuator 77 has a first end pivotally connected to the base frame 35. More specifically, the actuator 77 includes a housing 100 and a drive rod 102 that extends and retracts relative to the housing 100, and the housing 100 is pivotally connected at the first end to the base frame 35 via a base bracket 104. The base bracket 104 is fixed to the base frame 35 (e.g., via fasteners, welding, or the like). The first end of the actuator 77 pivots about pivot axis P3 fixed relative to the base frame 35. The pivot axis P3 is defined by the base bracket 104 via a pivot pin, pivot shaft, or any other suitable pivot connection. The actuator 77 extends from the first end to a second end that is pivotally connected to the foot end legs 80 via a support bracket 106. The support bracket 106 is fixed to a foot end support member 98 (see FIG. 1). The support bracket 106 is fixed to the foot end support member 98 via fasteners, welding, or the like. The second end of the actuator 77 pivots about pivot axis P4 defined by the support bracket 106 via a pivot pin, pivot shaft, or any other suitable pivot connection. In the version shown, the head end support member 96 interconnects the second ends of the pair of head end legs 78 and the foot end support member 98 interconnects the second ends of the pair of foot end legs 80 (see FIGS. 1 and 5). Thus, the support members 96, 98 act as cross supports rigidly fixed to the respective legs 78, 80 to move with the legs 78, 80. The support members 96, 98, may be fixed to their respective legs 78, 80 in any suitable manner, such as by fasteners, welding, or the like. Thus, any forces applied to the support bracket 106 via the actuator 77 is transmitted to the foot end legs 80 by virtue of the rigid connection of the support bracket 106 to the foot end legs 80.

The actuator 77 may also be a rotary actuator, arranged relative to the foot end legs 80 and links 108 in the same manner that the actuator 76 shown in FIG. 5A is arranged relative to the head end legs 78 and links 110. The actuator 77 may also be arranged like the actuator 76 shown in FIGS. 5B and 5C, instead acting between the foot end legs 80 and the links 108. Numerous actuator types and arrangements are possible to operate the lifts 72, 74 to lift and lower the support frame 36 relative to the base 34.

The actuators 76, 77 are operably coupled to the respective legs 78, 80 to longitudinally move the second ends of the respective legs 78, 80 via the guided bodies B1, B2 and guide tracks 92, 94 and cause the respective legs 78, 80 (by virtue of their pivot connections) to pivot about the upper and lower pivot axes P1, P2 to lift and lower the support frame 36 relative to the base 34. The actuators 76, 77 include linear actuators, rotary actuators, or other types of actuators. The actuators 76, 77 may be electrically operated, hydraulic, electro-hydraulic, pneumatic, or the like. The actuators 76, 77 may include motors, gear trains, drive screws, nuts/lead screws, and the like, for actuation. In the version shown, the actuators 76, 77 are electric, motor-driven actuators.

Still referring to FIG. 2, one or more first links 108 are pivotally connected at a first end to the foot end legs 80 and extend from the first end to a second end pivotally connected to the base 34. In the version shown, two first links 108 are pivotally connected to the foot end legs 80 to pivot about a pivot axis P5 that moves with the foot end legs 80 (only one first link 108 is shown in FIGS. 2 through 4B). Each of the first links 108 are pivotally connected to the base frame 35 to pivot about a pivot axis P6 that is fixed relative to the base frame 35. The pivot connections for the first links 108 may be formed via pivot pins, pivot shafts, or any other suitable pivot connections. The pivot axis P5 is located in-line with and halfway between the upper pivot axis P1 and the lower pivot axis P2 for the foot end legs 80.

The first links 108, in some versions, control and somewhat constrain movement of the support frame 36 during lifting and lowering, owing to their pivot connections with the foot end legs 80 and the base frame 35, and owing to the upper pivot axes P1 being fixed to the support frame 36 (some slight, relative movements may be allowed by the load cells 82). Compare FIGS. 2 and 3 and note that the upper pivot axes P1 remain vertically aligned with the lower pivot axes P2 during raising and lowering. Moreover, when the lifts 72, 74 are operated independently to place the support frame 36 in a Trendelenburg position, as shown in FIGS. 4A and 4B, the first links 108 act to prevent the upper pivot axis P1 at the foot end from shifting longitudinally relative to the base 34. Conversely, the upper pivot axis P1 at the head end shifts longitudinally.

One or more second links 110 are pivotally connected at a first end to the head end legs 78 and extend from the first end to a second end pivotally connected to the base 34. In the version shown, two second links 110 are pivotally connected to the head end legs 78 to pivot about the pivot axis P7 that moves with the head end legs 78 (only one second link 110 is shown in FIGS. 2 through 4B). The second links 110 are also pivotally connected to the base frame 35 to pivot about a pivot axis P8. Unlike the first links 108 and the pivot axis P6, the pivot axis P8 is not fixed relative to the base frame 35 but can move longitudinally relative to the base frame 35. Guided bodies B3 are pivotally connected at the second ends of the second links 110 about pivot axis P8 to slide in guides 112. The guided bodies B3 and the guides 112 may be similar to those previously described to allow the second ends of the second links 110 to slide relative to the base 34 (see also FIG. 5A). The pivot connections for the second links 110 may be formed via pivot pins, pivot shafts, or any other suitable pivot connections. The pivot axis P7 is located in-line with and halfway between the upper pivot axis P1 and the lower pivot axis P2 for the head end legs 78. The actuator 76 for the head end lift 72 is operably coupled to the second links 110, as previously described.

As previously mentioned, when the lifts 72, 74 are operated independently to place the support frame 36 in a Trendelenburg position, the first links 108 act on the foot end lift 74 to prevent the upper pivot axis P1 at the foot end from shifting longitudinally relative to the base 34, but the upper pivot axis P1 at the head end does shift longitudinally. The second links 110 also shift longitudinally, as shown in FIGS. 4A and 4B. More specifically, when either or both of the actuators 76, 77 are operated to place the support frame 36 and the patient support deck 38 in the one or more Trendelenburg positions, the pivot axis P8 moves longitudinally to remain aligned with the upper pivot axis P1 at the head end (see the vertical line V2 shown in FIG. 4A compared to the vertical line V1 of FIG. 2 made by the pivot axes P1, P8 prior to moving to the Trendelenburg position). The guided bodies B3 thus move longitudinally in the guides 112 relative to the base 34 toward the foot end.

When moving to the Trendelenburg position, as shown in FIG. 4A, the horizontal, longitudinal distance between the upper pivot axes P1 and between the pivot axes P6, P8 gets smaller (see horizontal distance D2 compared to horizontal distance D1). The head end lift 72 slides toward the foot end lift 74 to accommodate movement of the support frame 36 to the one or more Trendelenburg positions. This occurs when placing the support frame 36 and the patient support deck 38 in either of the Trendelenburg positions shown in FIGS. 4A and 4B. Thus, operation of either or both lifts 72, 74 to place the support frame 36 and the patient support deck 38 in a Trendelenburg position causes the upper pivot axis P1 associated with the head end lift 72 to move longitudinally closer to the foot end. Likewise, the pivot axis P8 and associated guided bodies B3 also move longitudinally closer to the foot end. The lower pivot axis P2 and corresponding guided bodies B1 associated with the head end lift 72 also move longitudinally closer to the foot end. For example, comparing FIG. 2 to FIG. 4A, the head end lift 72 remains in the same configuration and fully slides toward the foot end lift 74 when the foot end lift 74 is actuated to place the support frame 36 and the patient support deck 38 in the Trendelenburg position of FIG. 4A. In other words, the head end legs 78, the second links 110, the guided bodies B1, the guided bodies B3, and the actuator 76 are all longitudinally displaced by a distance equal to D1-D2.

Another lift system that can be used on the patient support apparatus 30 is shown in U.S. Provisional Patent Application No. 62/948,540, filed on Dec. 16, 2019, entitled “Patient Support With Lift Assembly,” which is hereby incorporated herein by reference.

Figure 6:
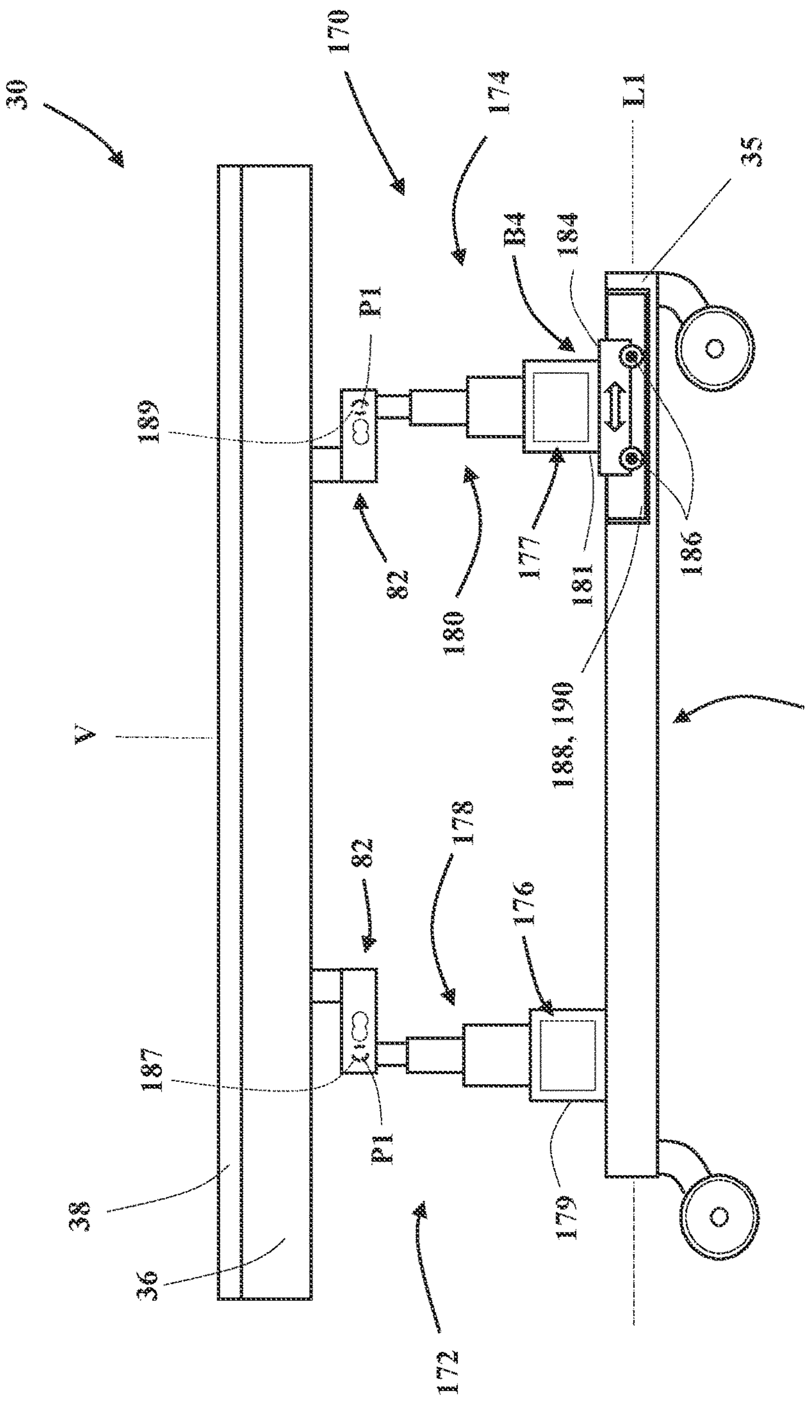
FIG. 6 is an elevational and schematic view of another patient support apparatus with a support frame at a first height relative to a base.
Figure 7A:
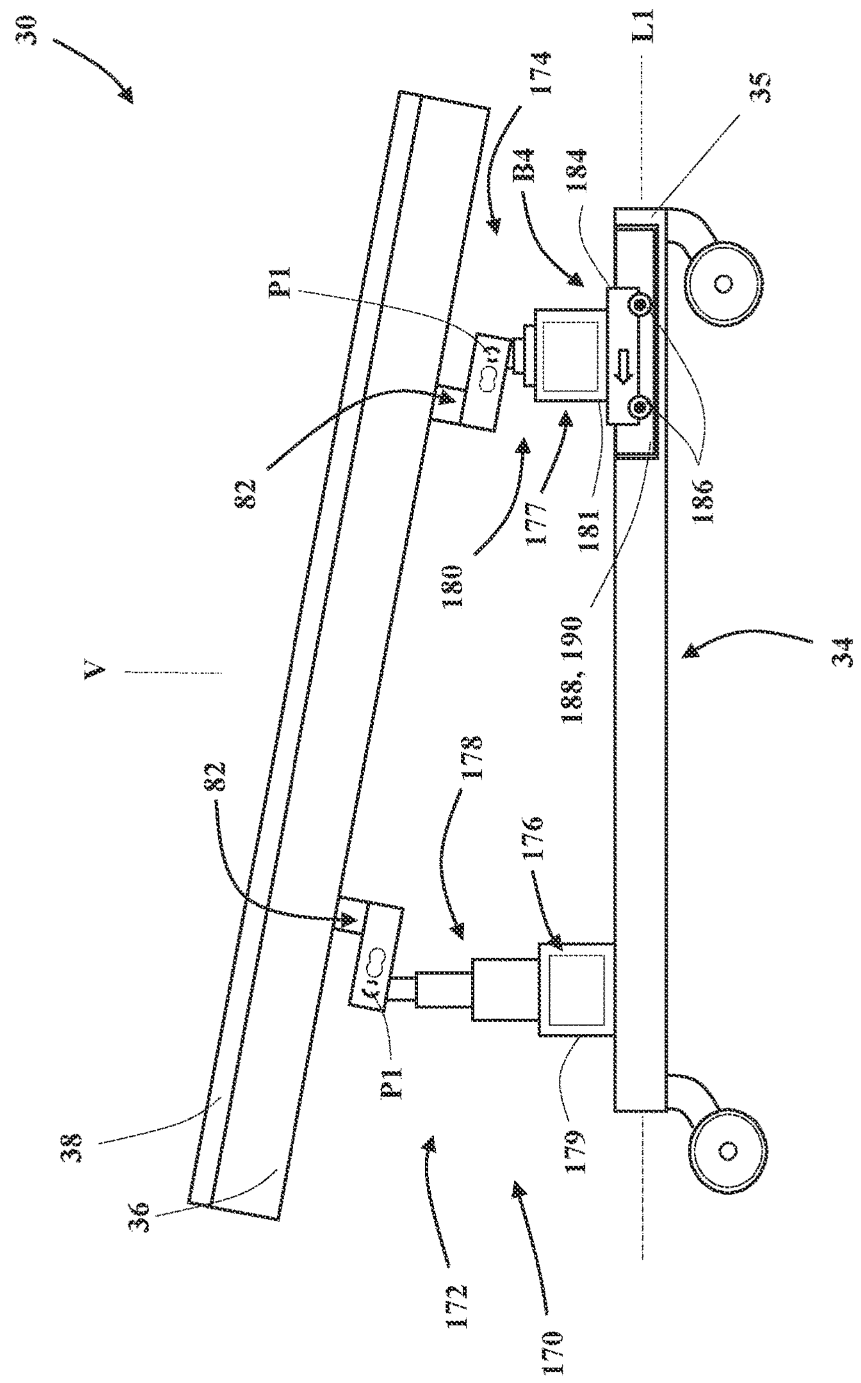
FIG. 7A is an elevational and schematic view of the patient support apparatus of FIG. 6 with the support frame in a Trendelenburg position.
Figure 7B:
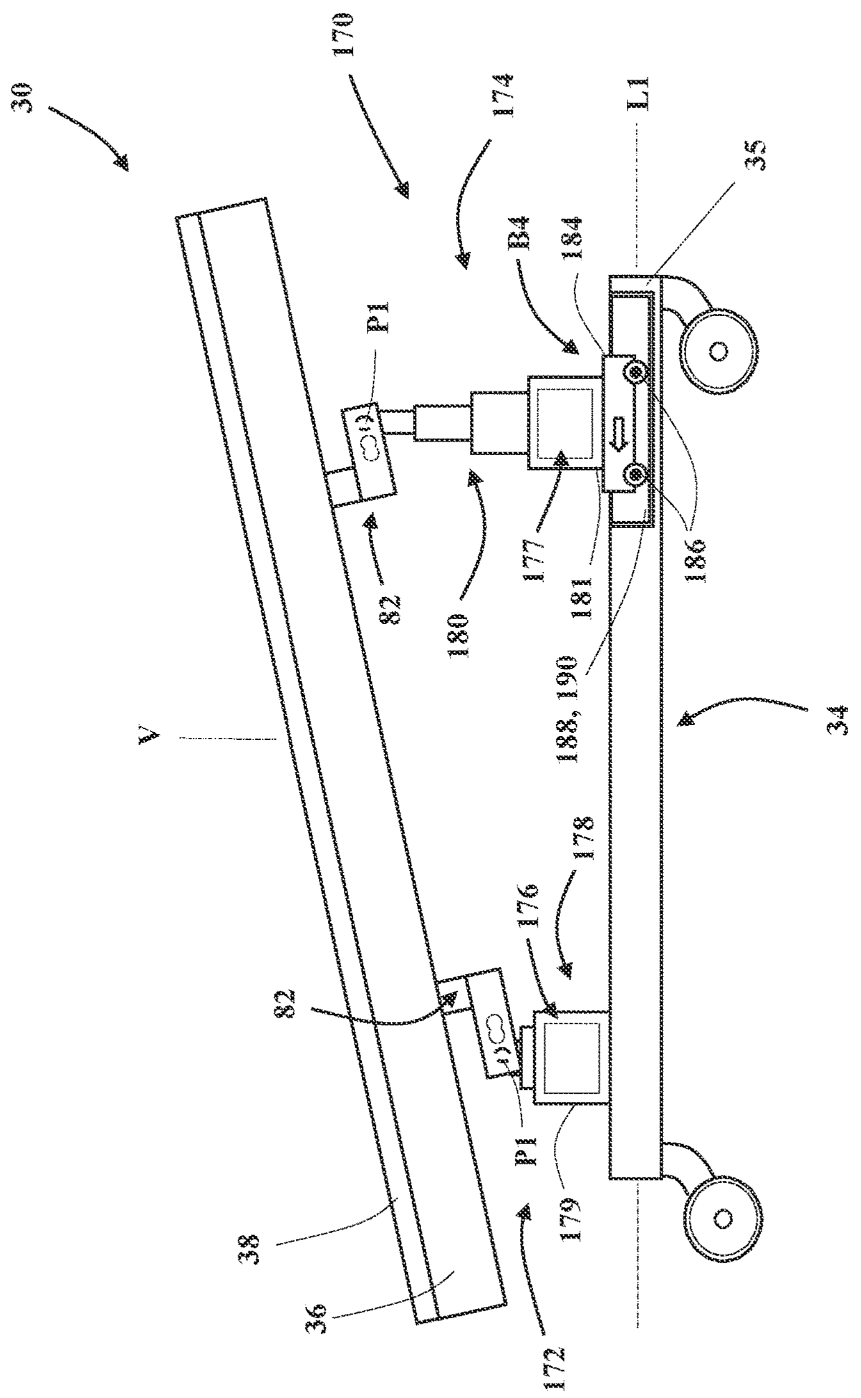
FIG. 7B is an elevational and schematic view of the patient support apparatus of FIG. 6 with the support frame in another Trendelenburg position.
Figure 8:
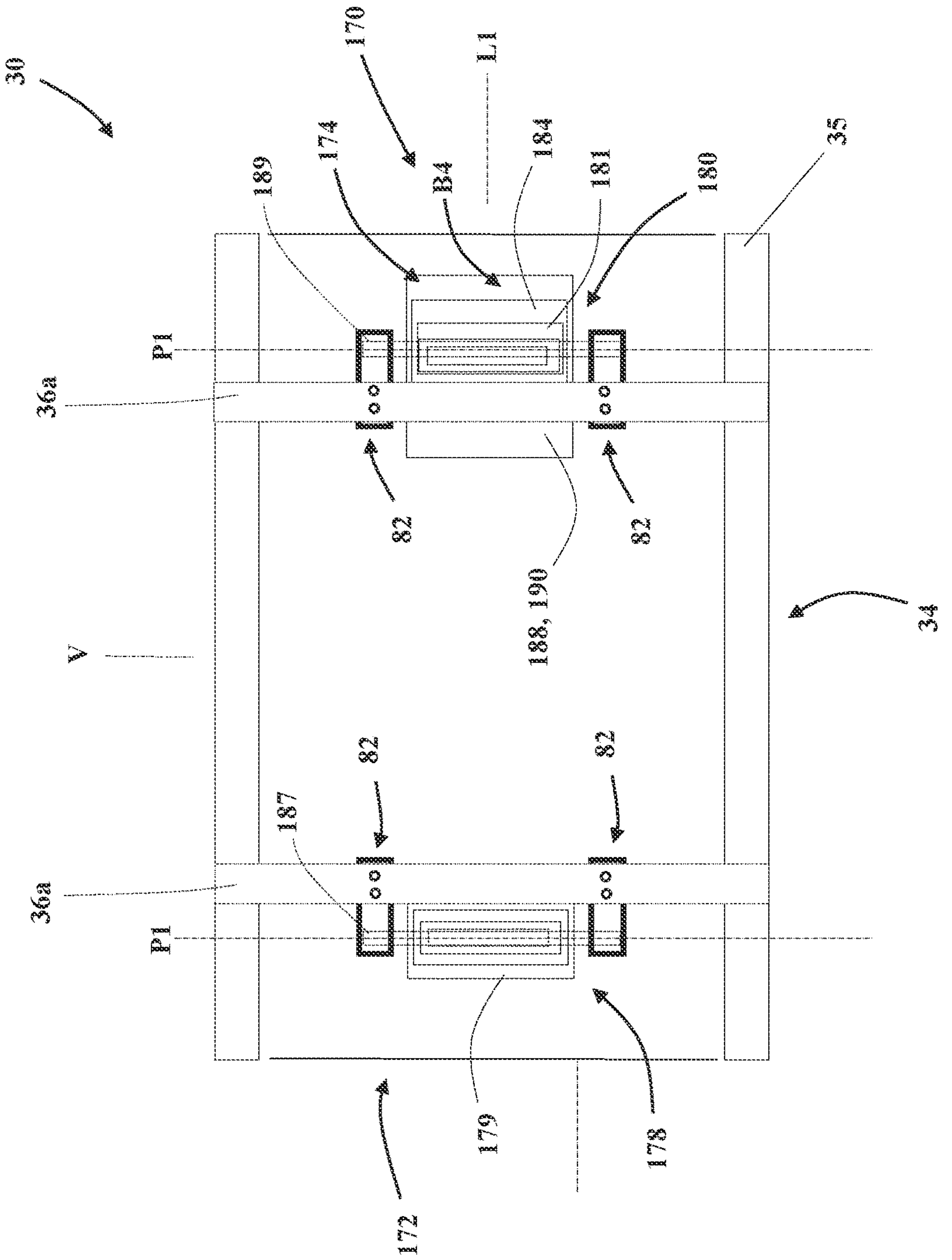
FIG. 8 is a top and schematic view of the patient support apparatus of FIG. 6 illustrating portions of the support frame, a lift system, load cells, and the base.

FIGS. 6 through 8 show another lift system 170 that operates to lift and lower the support frame 36 and the patient support deck 38 relative to the base 34 in much the same way as the lift system 70. The lift system 170 is configured to move the support frame 36 between various heights relative to the base 34. The lift system 170 includes a head end lift 172 and a foot end lift 174. The head end lift 172 is arranged to lift or lower the head end of the support frame 36 relative to the base 34. The foot end lift 174 is arranged to lift or lower the foot end of the support frame 36 relative to the base 34. Each of the head end lift 172 and the foot end lift 174 includes an actuator 176, 177 to actuate the lifts 172, 174. The lifts 172, 174 are separately and independently operable such that the support frame 36 and the patient support deck 38 can be placed in one or more Trendelenburg positions in which the head end and the foot end are at different heights relative to the base 34, as shown in FIGS. 7A and 7B.

The head end lift 172 and the foot end lift 174 may be interchangeable such that the head end lift 172 is at the foot end of the patient support apparatus 30 and the foot end lift 174 is at the head end of the patient support apparatus 30. FIGS. 6 through 7B are elevational and schematic views that illustrate the lifts 172, 174 and their operation. The mattress 40, side rails 44, 46, 48, 50, headboard 52, and footboard 54 have been removed in FIGS. 6 through 7B for illustration purposes.

In this version, the head end lift 172 includes a head end column lift 178 extending between a first pair of load cells 82 and the base 34 (only one of the pair of load cells 82 is shown in FIGS. 6 through 7B). The actuator 176 is arranged to extend and retract the head end column lift 178. The head end column lift 178 is fixed from sliding relative to the base 34 and has a base portion 179 fixed to the base frame 35. The foot end lift 174 includes a foot end column lift 180 extending between a second pair of load cells 82 and the base 34 (only one of the pair of load cells 82 is shown in FIGS. 6 through 7B). The actuator 177 extends and retracts the foot end column lift 180. The foot end lift 174 is allowed to slide relative to the base 34 and relative to the head end lift 172, as described further below, to accommodate movement of the support frame 36 to the one or more Trendelenburg positions.

The column lifts 178, 180 extend and retract vertically in a telescoping manner. An end of the head end column lift 178 is pivotally connected to the first pair of load cells 82 at an upper pivot axis P1. An end of the foot end column lift 180 is pivotally connected to the second pair of load cells 82 at an upper pivot axis P1. Pivot connections between the column lifts 178, 180 and the load cells 82 may be formed using any suitable brackets, pivot pins, pivot shafts, or any other suitable pivot connections. See, for example, the pivot shafts 187, 189 connecting the column lifts 178, 180 to the load cells 82 in FIG. 8. In some versions, the column lifts 178, 180 may be in the form of linear actuators such as the actuator 77 previously described, arranged and mounted to operate vertically. The column lifts 178, 180 may be hydraulic jacks capable of extending and retracting. The column lifts 178, 180 may be like those described in U.S. Pat. No. 6,820,294, entitled “Linkage For Lift/Lowering Control For A Patient Supporting Platform,” filed on Feb. 26, 2002, hereby incorporated herein by reference, or like those described in U.S. Pat. No. 7,395,564, entitled “Articulated Support Surface For A Stretcher Or Gurney,” filed on Mar. 24, 2006, hereby incorporated herein by reference.

The foot end column lift 180 includes a guided body B4 that supports the foot end column lift 180 during movement to the one or more Trendelenburg positions, as shown in FIGS. 7A and 7B. In the version shown, the guided body B4 includes a cart 184 with wheels 186. The cart 184 is fixed to a base portion 181 of the foot end column lift 180. The base 34 provides a guide 188 to receive the cart 184. The guide 188 includes a guide track 190 that constrains movement of the cart 184 to within the guide track 190. The guide track 190 may be defined by a bottom wall upon which the cart 184 and wheels 186 are supported and one or more side walls to constrain movement of the cart 184 so that motion is limited to being in the longitudinal direction during movement to the one or more Trendelenburg positions.

Owing to the pivot connections of the column lifts 178, 180 at the upper pivot axes P1, which are relatively fixed to the support frame 36, and owing to the head end column lift 178 having its base portion 179 fixed to the base frame 35, the guided body B4 is configured to translate longitudinally in the guide 188 during operation of either or both of the lifts 172, 174 to place the support frame 36 and the patient support deck 38 in a Trendelenburg position (compare FIGS. 6 and 7A or 7B). As illustrated by arrows in FIGS. 7A and 7B, when the support frame 36 and the patient support deck 38 are moved to a Trendelenburg position, the guided body B4, and by extension the foot end lift 174, slide toward the head end lift 172. If the lifts 172, 174 are simultaneously operated to lift or lower the support frame 36 while keeping the support frame 36 horizontal, then the guided body B4 would remain stationary (not shown).

Figure 9:
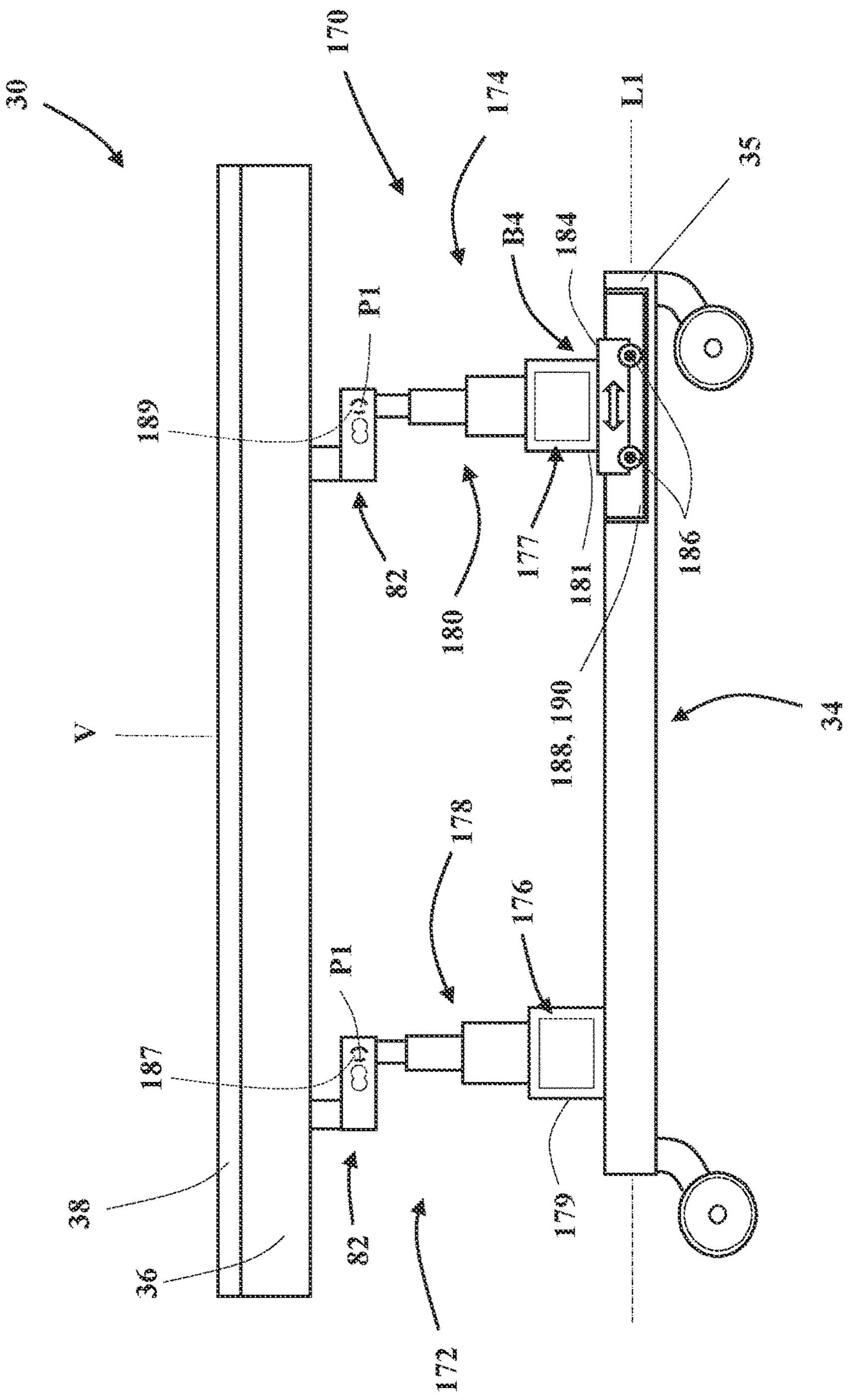
FIG. 9 is an elevational and schematic view of the patient support apparatus of FIG. 6 with the support frame at the first height relative to the base and with the load cells in an alternative arrangement.
Figure 10:
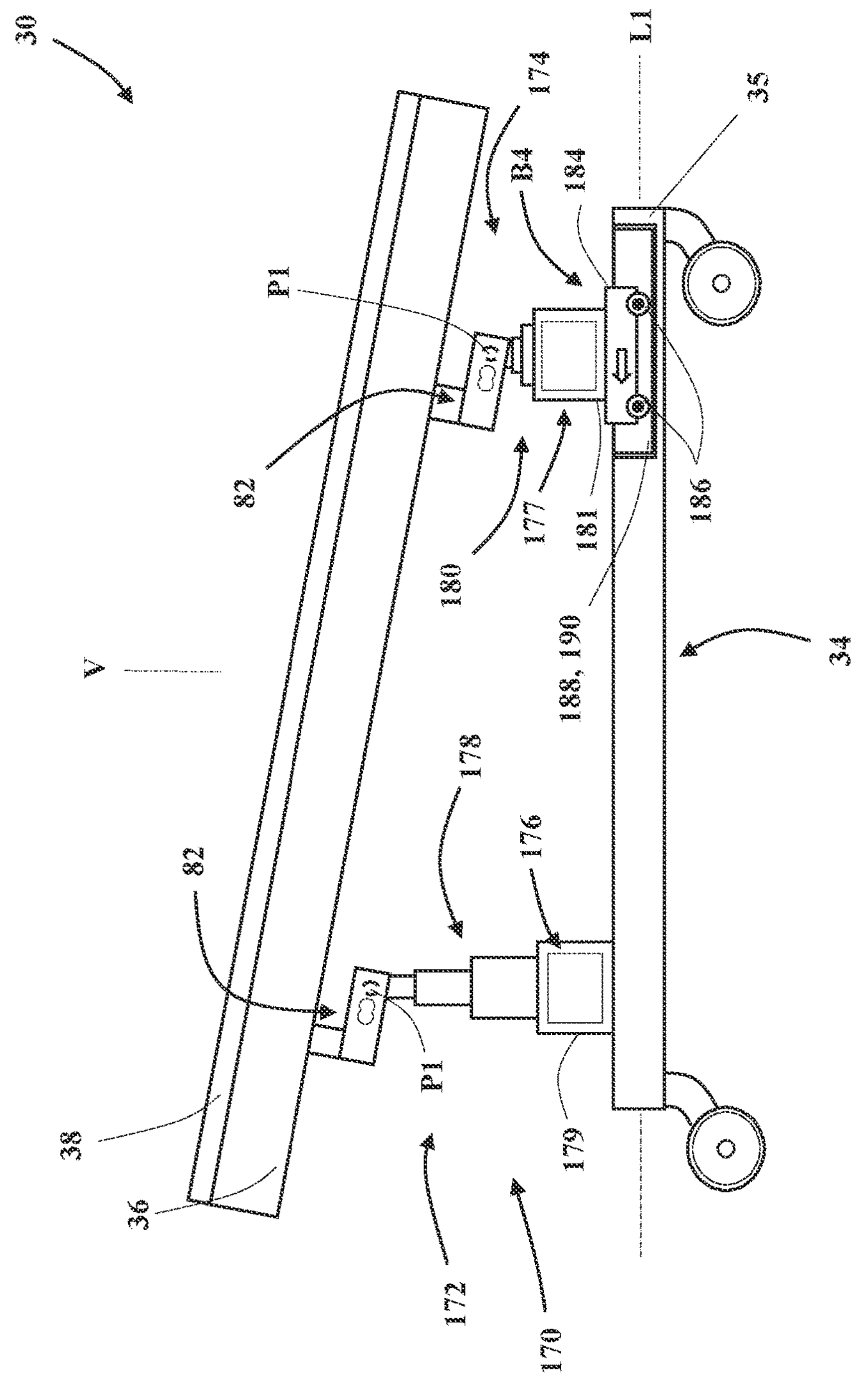
FIG. 10 is an elevational and schematic view of the patient support apparatus of FIG. 9 with the support frame in a Trendelenburg position.
Figure 11:
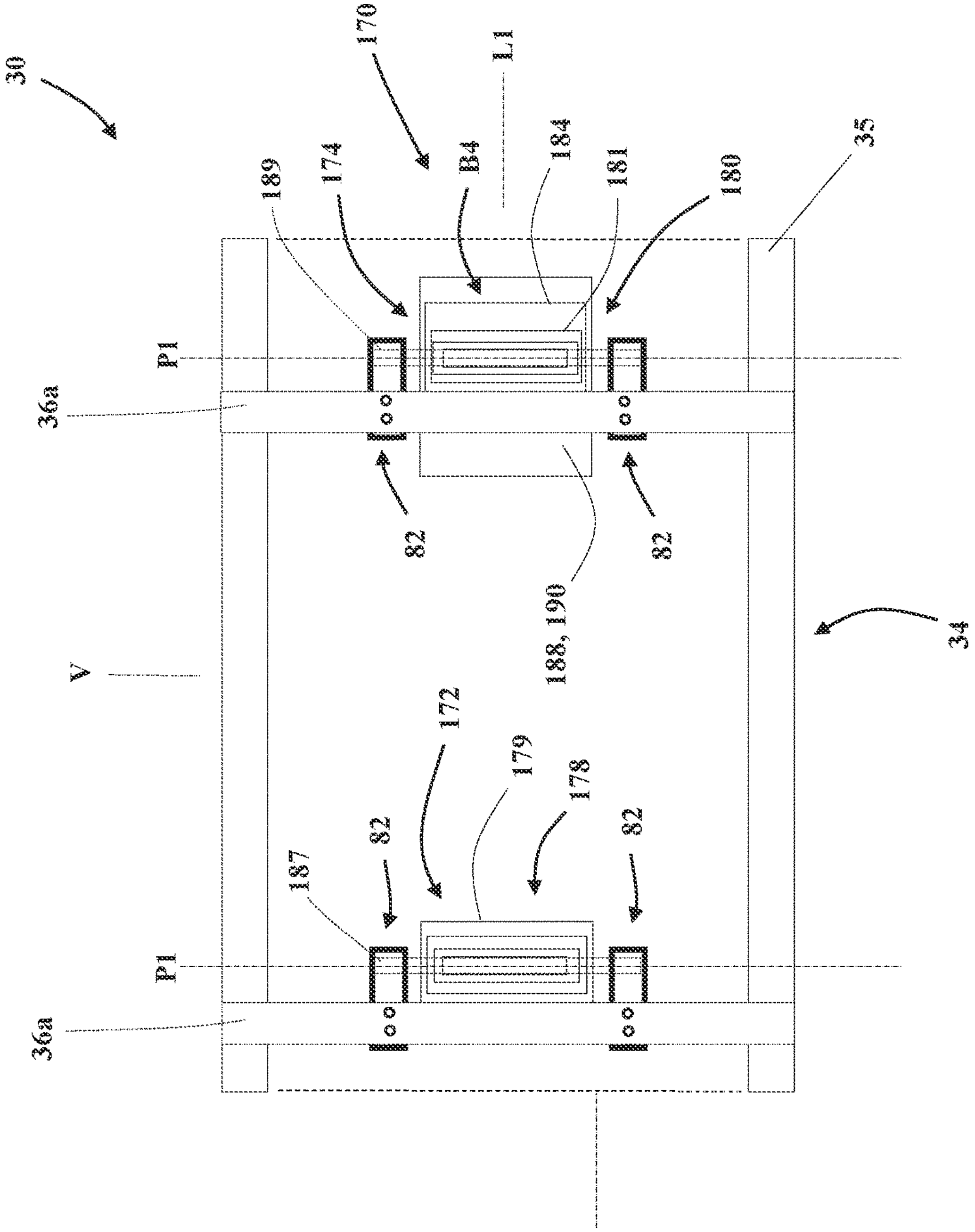
FIG. 11 is a top and schematic view of the patient support apparatus of FIG. 9 illustrating portions of the support frame, the lift system, the load cells, and the base.

FIGS. 9 through 11 show the same lift system 170 as shown in FIGS. 6 through 8, except that the load cells 82 connected to the head end column lift 178 have been rearranged to be in the same longitudinal arrangement as the other load cells 82 pivotally connected to the foot end column lift 180. In the version shown in FIGS. 6 through 8, the pairs of load cells 82 are mounted to the support frame 36, but in opposing orientations. In FIGS. 9 through 11, the pairs of load cells 82 are mounted to the support frame 36 in the same orientation.

Figure 12:
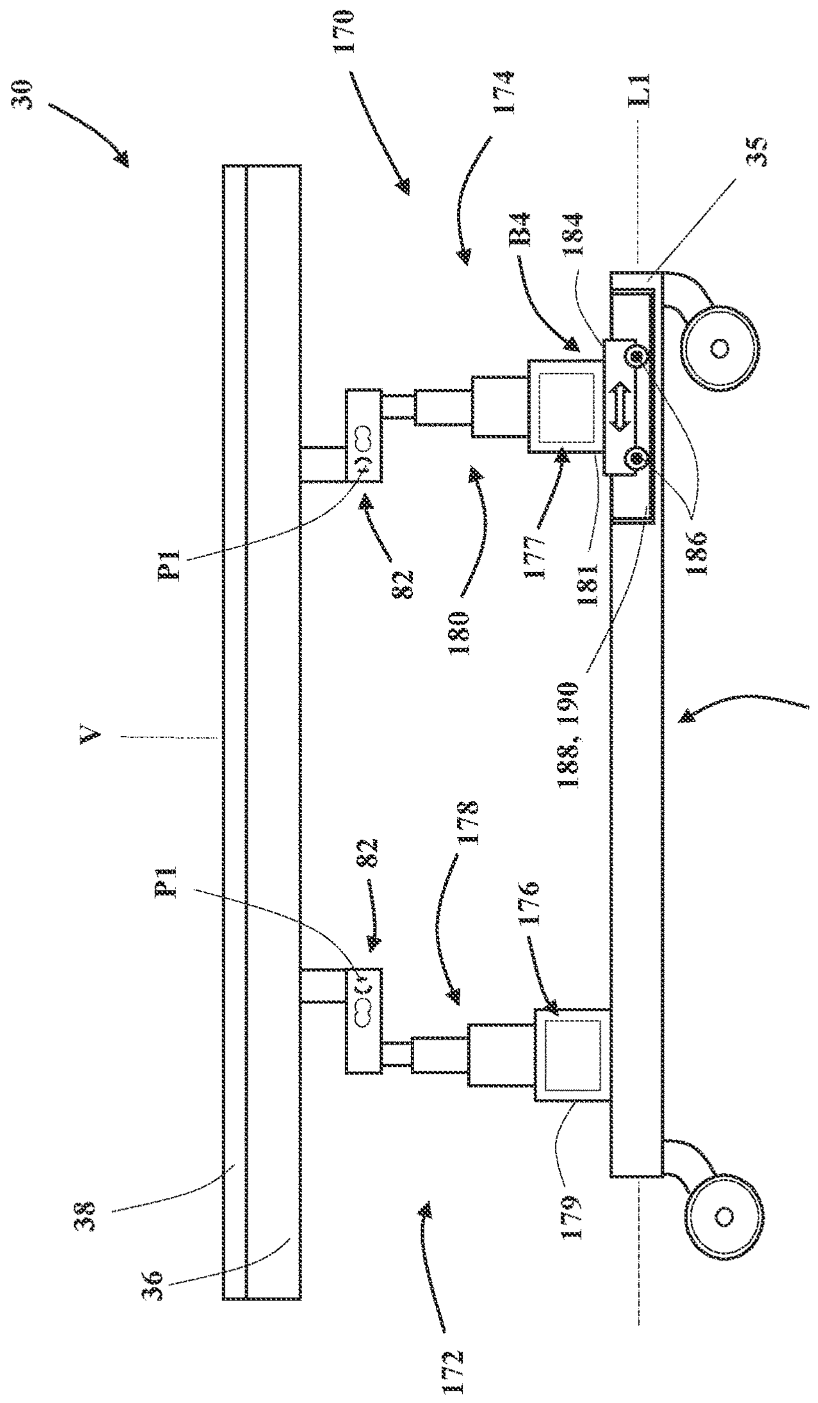
FIG. 12 is an elevational and schematic view of the patient support apparatus of FIG. 6 with the support frame at the first height relative to the base and with the load cells in an alternative arrangement.
Figure 13:
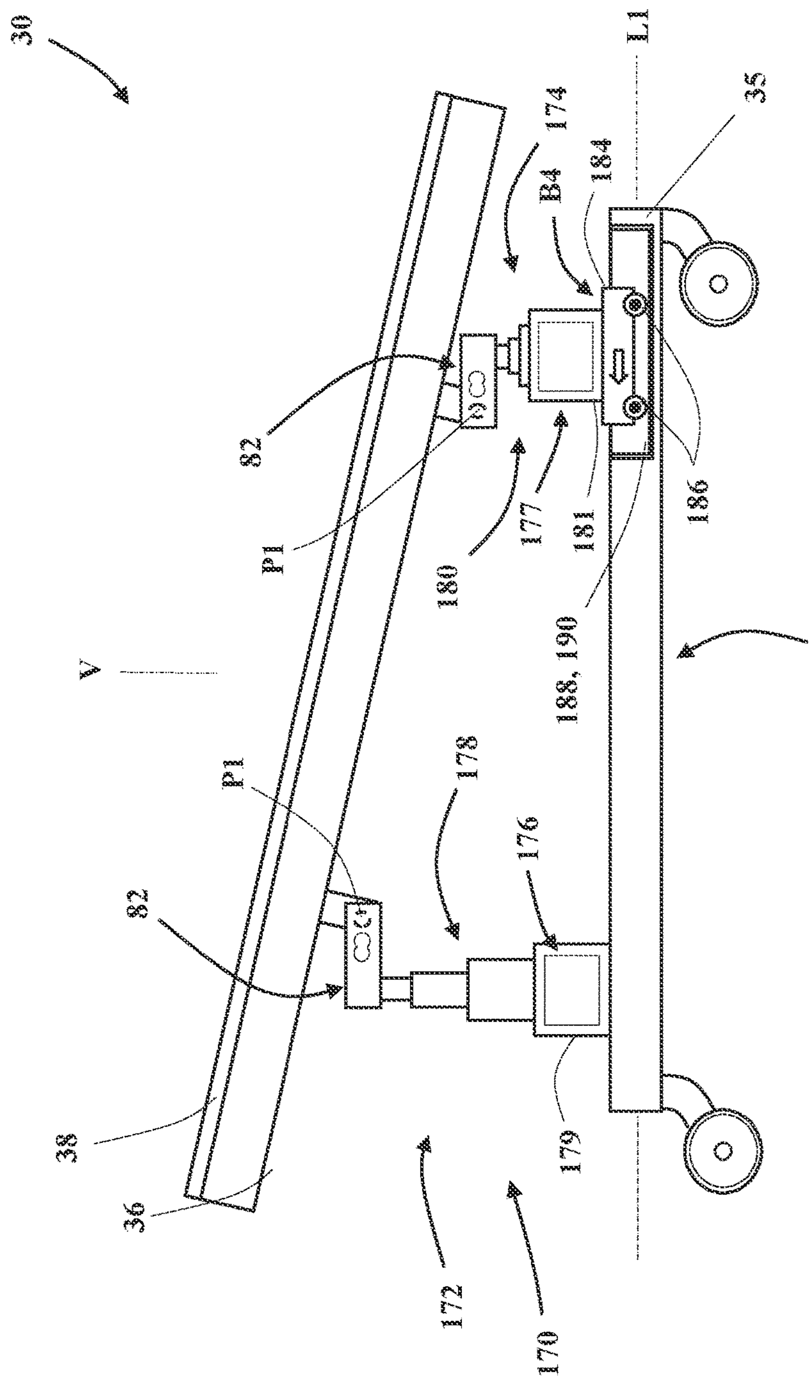
FIG. 13 is an elevational and schematic view of the patient support apparatus of FIG. 12 with the support frame in a Trendelenburg position.

FIGS. 12 and 13 illustrate another alternative arrangement of the load cells 82 in which their mounting portions are fixed to the lifts 172, 174 instead of the support frame 36, and are pivotally connected to the support frame 36 at pivot connections to pivot about pivot axes P1 (compare FIGS. 12 and 13 to see the pivotal motion). As a result, the load cells 82 remain substantially horizontally oriented, parallel to the longitudinal axis L1 of the base 34, during movement of the support frame 36 to the one or more Trendelenburg positions (see FIG. 13). Conversely, in the versions shown in FIGS. 1 through 11, the plurality of load cells 82 are arranged to tilt with the support frame 36 during movement of the support frame 36 to the one or more Trendelenburg positions.

Figure 14:
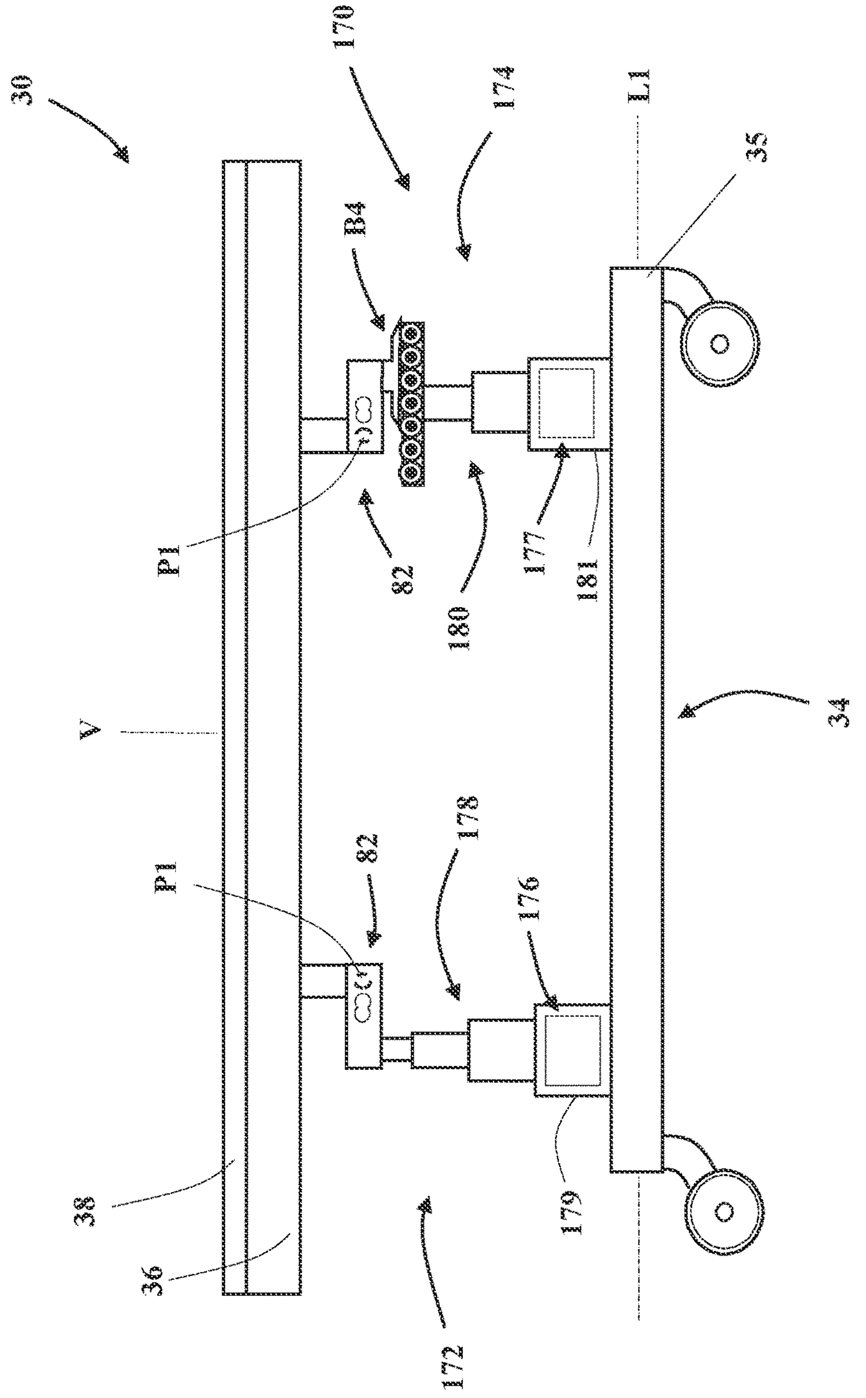
FIG. 14 is an elevational and schematic view of another patient support apparatus with a support frame at a first height relative to a base.
Figure 15:
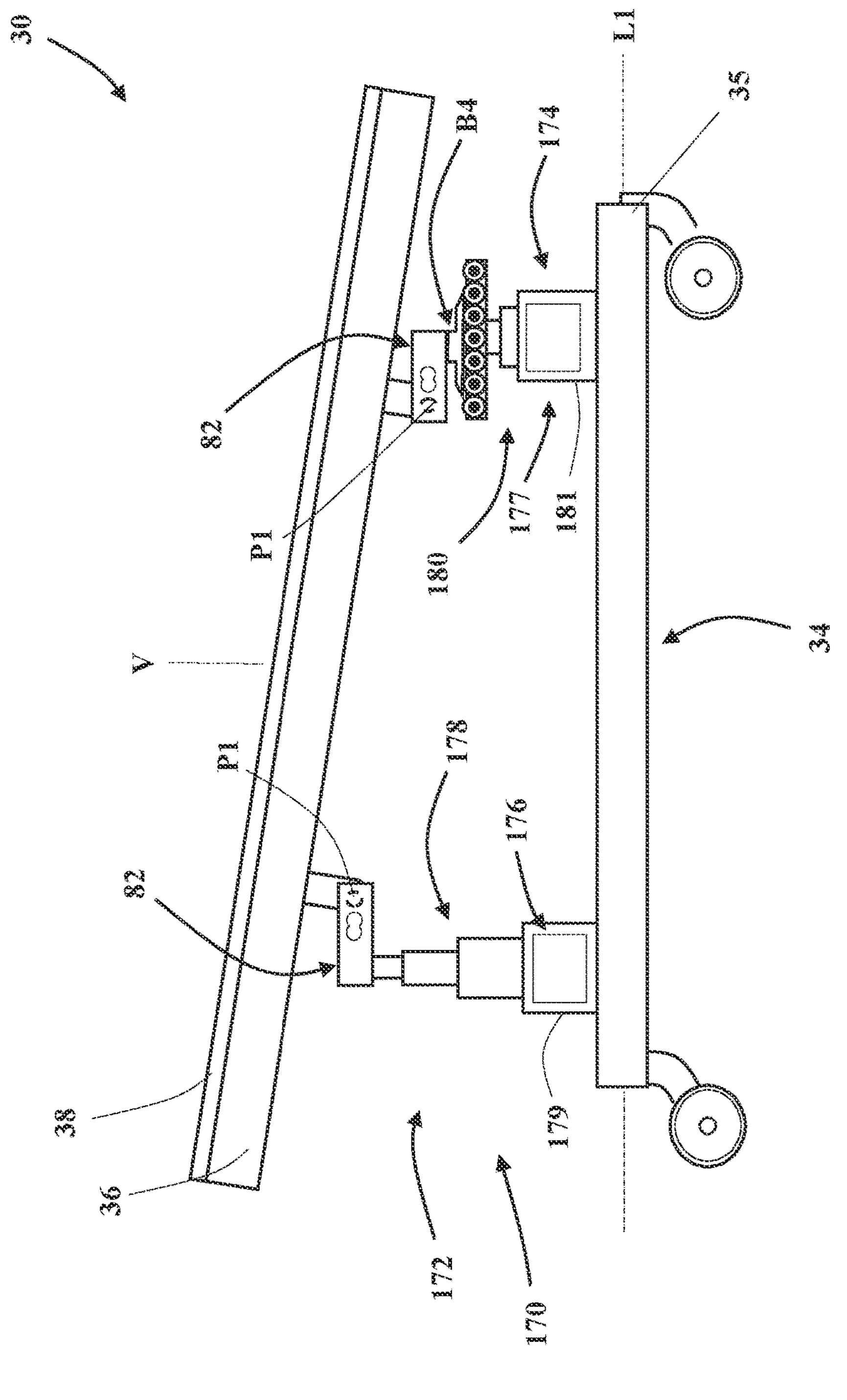
FIG. 15 is an elevational and schematic view of the patient support apparatus of FIG. 14 with the support frame in a Trendelenburg position.

FIGS. 14 and 15 illustrate another alternative arrangement of the load cells 82 in which the load cells 82 at the foot end have their mounting portions fixed to the guided body B4 to slide relative to the foot end lift 174. In this version, both of the lifts 172, 174 are fixed from sliding longitudinally, even during movement of the support frame 36 to the one or more Trendelenburg positions. Instead, the load cells 82 at the foot end slide, with the guided body B4, relative to the foot end lift 174 via a sliding mechanism (shown, for example, as a plurality of rollers). In this version, all of the load cells 82 remain horizontal during movement of the support frame 36 to the one or more Trendelenburg positions.

Figure 16:
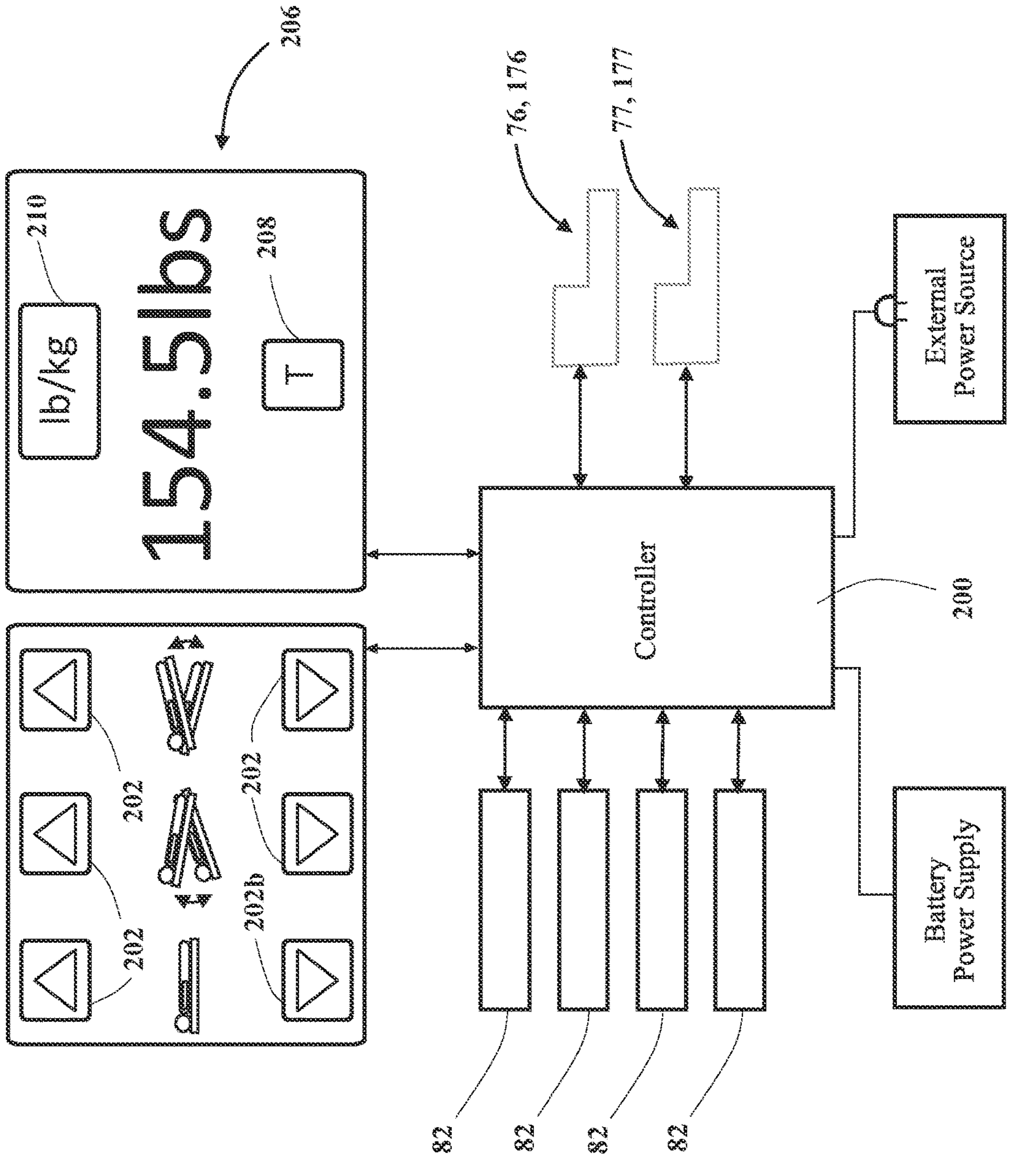
FIG. 16 is a schematic view of a control system.

Referring to FIG. 16, a control system is shown to control operation of the actuators 76, 77, 176, 177. The control system includes a controller 200 having one or more processors for processing instructions or for processing algorithms stored in memory to control operation of the actuators 76, 77, 176, 177 to coordinate movement of the actuators 76, 77, 176, 177 to evenly lift and lower the support frame 36 relative to the base 34 or to independently operate the actuators 76, 77, 176, 177 to place the support frame 36 in a Trendelenburg position, e.g., a normal or reverse Trendelenburg position. Additionally or alternatively, the controller 200 may include one or more microcontrollers, microprocessors, field programmable gate arrays, systems on a chip, discrete circuitry, and/or other suitable hardware, software, or firmware that is capable of carrying out the functions described herein. The controller 200 may be carried onboard the patient support apparatus 30 or may be remotely located. In some versions, the controller 200 is mounted to the base 34. In some versions, the controller 200 is mounted to the footboard 54. Power to the actuators 76, 77, 176, 177 and/or the controller 200 may be provided by a battery power supply and/or an external power source.

The controller 200 is coupled to the actuators 76, 77, 176, 177 in a manner that allows the controller 200 to control the actuators 76, 77, 176, 177. The controller 200 may communicate with the actuators 76, 77, 176, 177 via wired or wireless connections to perform one of more desired functions. The controller 200 may monitor a current state of the actuators 76, 77, 176, 177 via one or more sensors and determine desired states in which the actuators 76, 77, 176, 177 should be placed, based on one or more input signals that the controller 200 receives from one or more user input devices. The state of the actuators 76, 77, 176, 177 may be a position, a relative position, an angle, an energization status (e.g., on/off), or any other parameter of the actuators 76, 77, 176, 177.

A user, such as a caregiver, may actuate one or more user input devices 202, which transmit corresponding input signals to the controller 200, and the controller 200 controls operation of the actuators 76, 77, 176, 177 based on the input signals. The user input devices 202 may include any device capable of being actuated by the user and may be provided on a control panel, touchscreen, or the like. The user input devices 202 may be configured to be actuated in a variety of different ways, including but not limited to, mechanical actuation (hand, foot, finger, etc.), hands-free actuation (voice, foot, etc.), and the like. The user input devices 202 may include buttons (such as buttons corresponding to lift, lower, normal Trendelenburg, and reverse Trendelenburg), a gesture sensing device for monitoring motion of hands, feet, or other body parts of the user (such as through a camera), a microphone for receiving voice activation commands, a foot pedal, and sensors (e.g., infrared sensor such as a light bar or light beam to sense a user's body part, ultrasonic sensors, capacitive sensors, etc.). Additionally, the buttons/pedals can be physical buttons/pedals or virtually implemented buttons/pedals such as through optical projection or on a touchscreen. The buttons/pedals may also be mechanically connected or drive-by-wire type buttons/pedals where a user applied force actuates a sensor, such as a switch or potentiometer. It should be appreciated that any combination of user input devices may also be utilized. The user input devices may be located on one of the side rails 44, 46, 48, 50, the headboard 52, the footboard 54, or other suitable locations. The user input devices may also be located on a portable electronic device (e.g., iWatch®, iPhone®, iPad®, or similar electronic devices).

During operation, when a user wishes to move the support frame 36 relative to the base 34, the user actuates one or more of the user input devices 202. For instance, in the event the user wishes to lower the support frame 36 relative to the base 34, such as moving the support frame 36 from the position shown in FIG. 2 to the position shown in FIG. 3, the user actuates the appropriate user input device 202 (see touchscreen button 202*b*, for example). Upon actuation, the controller 200 sends output signals to the actuators 76, 77 to cause simultaneous operation of the actuators 76, 77 in a manner that causes the support frame 36 to lower.

The control system may also include a scale to indicate a patient's weight and/or to detect a patient's position/movement on the patient support apparatus 30, such as in conjunction with a bed exit alert system. The scale includes the load cells 82 connected to the controller 200 to provide signals associated with loads measured by each of the load cells 82. For example, each load cell 82 may include a pair of activation leads and a pair of sensor leads. The controller 200 may include a circuit in electrical communication with the activation leads to supply electrical power to the load cell 82 via one of the activation leads with the other activation lead coupled to ground. The controller 200 may be in electrical communication with the sensor leads that provide output to the controller 200, wherein the output correlates to how much force is being exerted on the load cell 82. See, for example, the description of load cells in U.S. patent application Ser. No. 16/549,612, entitled "Angle Calibration Using Load Cells," filed Aug. 23, 2019, hereby incorporated herein by reference.

The output signals received from the load cells 82 via their sensor leads are collectively processed by the controller 200 using scale algorithms to determine, for example, a patient's weight to output to a display 206, as shown in FIG. 16. See, for example, the methods described in U.S. patent application Ser. No. 16/549,612, entitled "Angle Calibration Using Load Cells," incorporated by reference herein. The scale may include a tare function 208 and a converter 210 to switch between kilograms and pounds. In some versions, by placing the load cells 82 between the lifts 72, 74, 172, 174 and the support frame 36, the lifts 72, 74, 172, 174 are not part of the tare weight thereby reducing the tare weight as compared to patient support apparatuses that rely on separate weigh frames located beneath the lifts.

Figure 17:
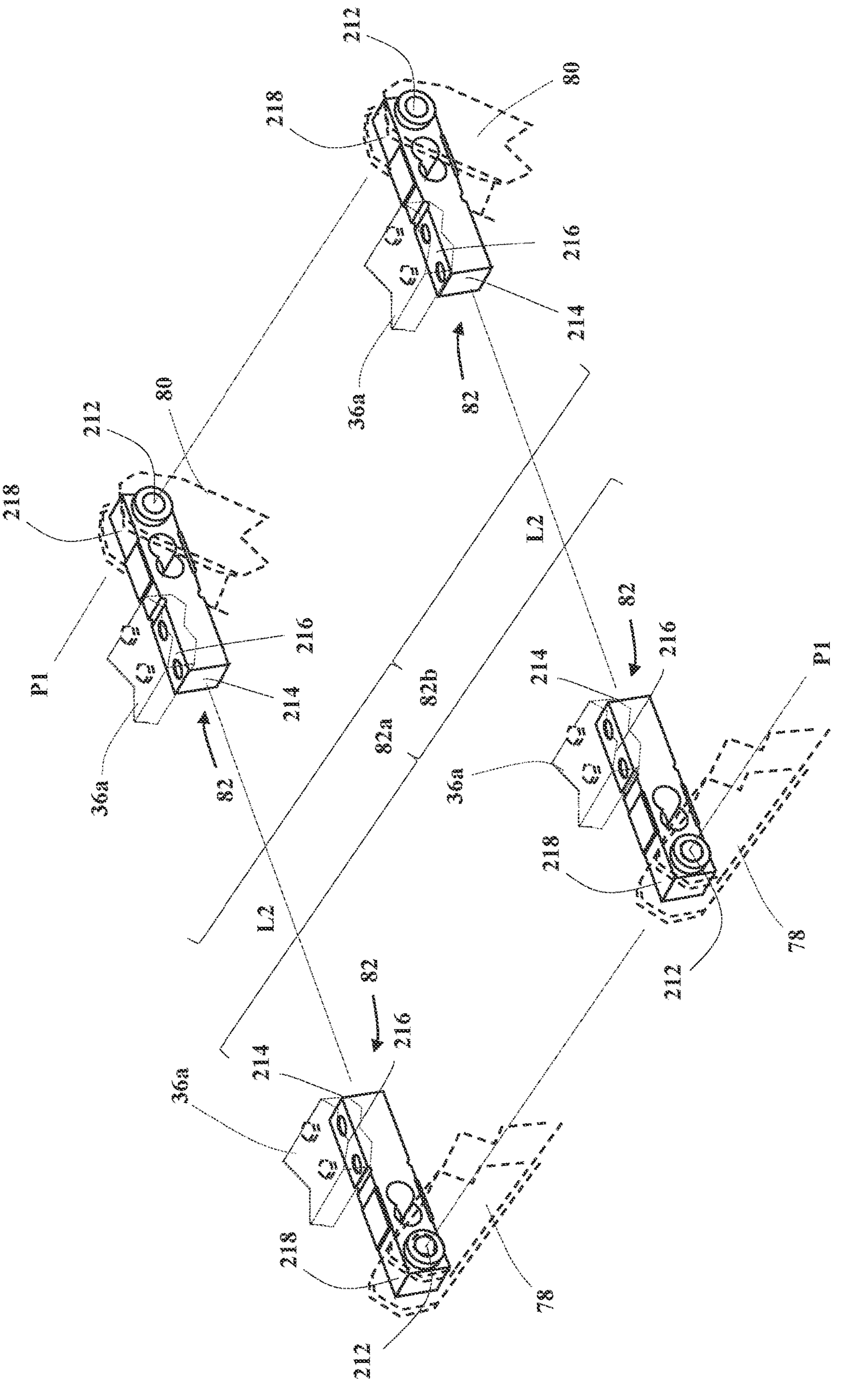
FIG. 17 is a perspective view of an arrangement of load cells of the patient support apparatus of FIG. 1.
Figure 18:
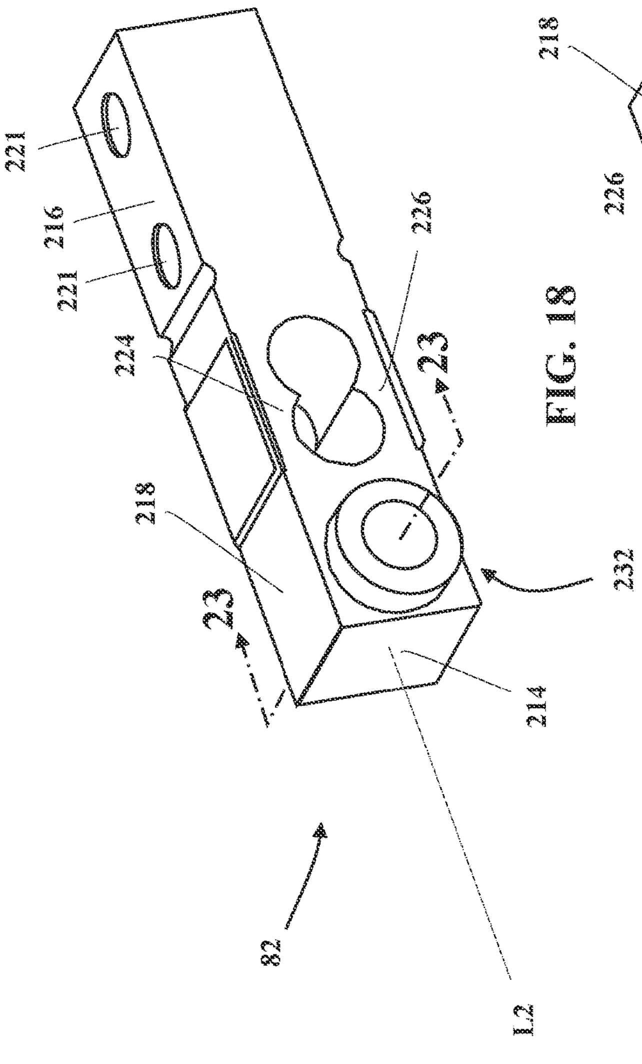
FIG. 18 is a top perspective view of a load cell.
Figure 19:
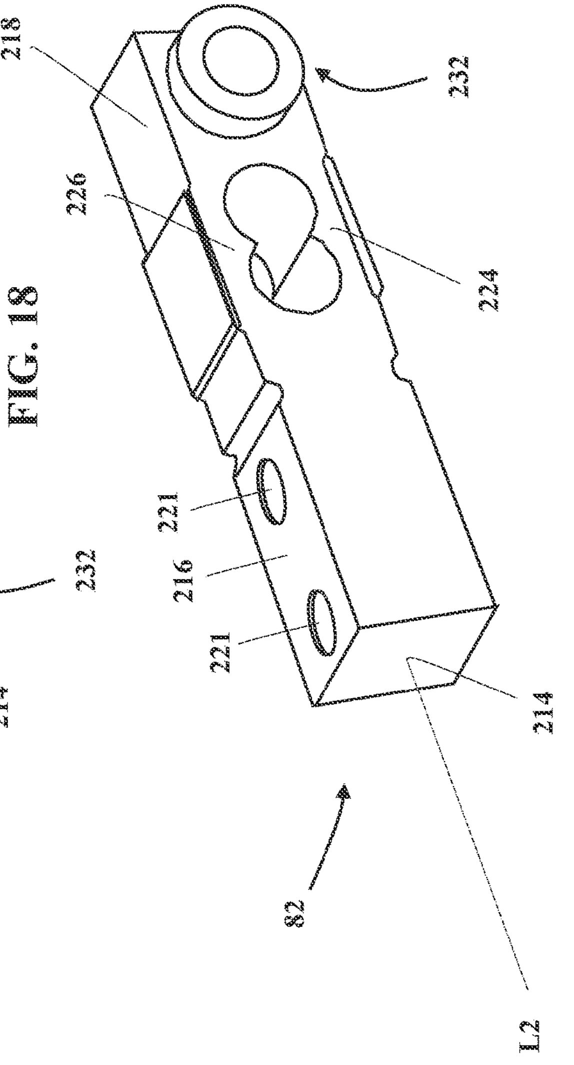
FIG. 19 is a bottom perspective view of the load cell of FIG. 18.

FIG. 17 illustrates one arrangement of the load cells 82 from the patient support apparatus 30 of FIGS. 1 through 5. In the version shown, a pair 82*a* of the load cells 82 are coupled to the head end legs 78 and a pair 82*b* of the load cells 82 are coupled to the foot end legs 80. The load cells 82 are arranged such that a load on the support frame 36 is transmitted to the plurality of load cells 82 to measure the load. Portions 36*a* of the support frame 36 to which the load cells 82 are mounted via one or more fasteners are shown in FIG. 17. The load cells 82 may be mounted to the support frame 36 via fasteners, welding, or the like. The first ends of the legs 78, 80 are shown pivotally connected to the respective pairs of load cells 82 by pivot shafts 212.

Each of the load cells 82 includes an elongate body 214 extending longitudinally along a longitudinal axis L2 from a mounting portion 216 to a load application portion 218. The mounting portions 216 are mounted and fixed to the portions 36*a* of the support frame 36 as shown in FIG. 17. In the versions shown, each of the plurality of load cells 82 is arranged longitudinally between the head end and the foot end of the support frame 36. The lifts 72, 74 are pivotally connected to the load application portions 218 of the load cells 82 by virtue of their corresponding legs 78, 80 being pivotally connected to the load application portions 218 at the pivot axes P1. In some versions, the mounting portions 216 are mounted and fixed to the lifts 72, 74, 172, 174 and the load application portions 218 are pivotally connected to the support frame 36 (see, e.g., FIGS. 12 and 13). In FIG. 17, the pairs 82*a*, 82*b* of the load cells 82 are shown longitudinally aligned and oriented such that their load application portions 218 face in an opposite direction. In some versions, like shown in FIGS. 9 through 11, the pairs 82*a*, 82*b* of the load cells 82 are longitudinally aligned and oriented such that the load application portions 218 face in a common direction.

Figures 20, 21, 22:
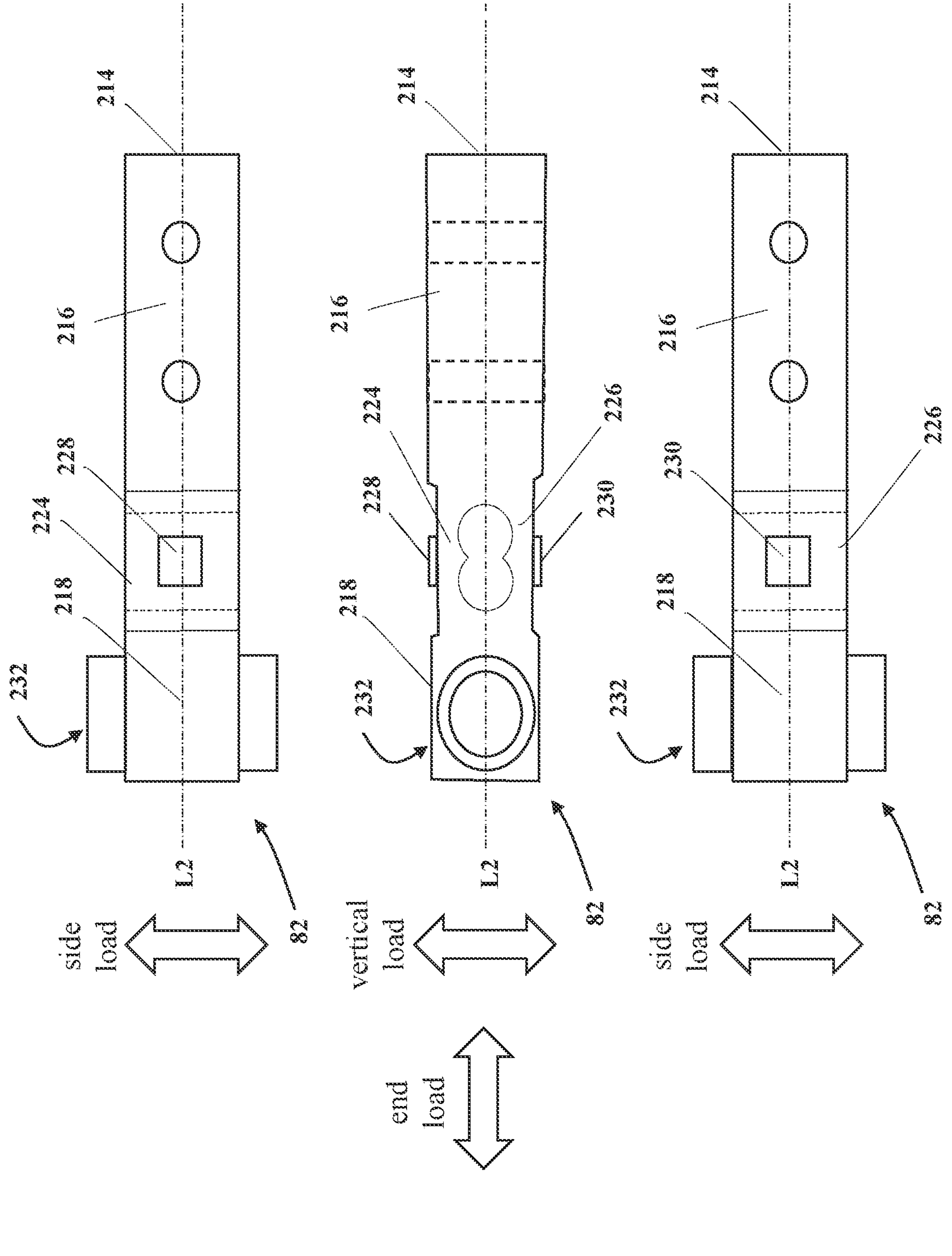
FIG. 20 is a top view of the load cell of FIG. 18.
FIG. 21 is a side view of the load cell of FIG. 18.
FIG. 22 is a bottom view of the load cell of FIG. 18.

One of the load cells 82 is shown in more detail in FIGS. 18 through 27. In some versions, the load cells 82 are identical. In some versions, the load cells may be of different types, shapes, sizes, resolutions, etc. One type of the load cells 82 will be described in detail. Referring to FIGS. 18 through 22, a beam type load cell is shown. The mounting portion 216 of the load cell 82 includes a pair of bores 221 to receive fasteners to mount the mounting portion 216. The load application portion 218 of the load cell 82 receives the pivot shaft 212 used to connect one of the legs 78, 80, for example, to the load cell 82. The elongate body 214 of the load cell 82 also includes upper and lower beams 224, 226 connecting the load application portion 218 to the mounting portion 216. As best shown in FIGS. 20 through 22, one or more upper strain gauges 228 are coupled to the upper beam 224 and one or more lower strain gauges 230 are coupled to the lower beam 226.

Referring to FIGS. 20 through 22, the beams 224, 226 and strain gauges 228, 230 are arranged so that the strain gauges 228, 230 are more sensitive to loads being applied transverse to the longitudinal axis L2 as compared to loads being applied along the longitudinal axis L2. Ideally, loads are applied solely in a vertical direction, perpendicular to the longitudinal axis L2 (see "vertical load"). Under such loads, the upper and lower beams 224, 226 are placed into tension and compression, respectively, or vice versa, depending on the direction of the vertical load. The upper strain gauge 228 and the lower strain gauge 230 have positive and negative polarities, respectively, in compression. As a result, the upper strain gauge 228 and the lower strain gauge 230 are doubly sensitive to vertical loads to suitably measure the load applied.

If during measurement of the load, there is a longitudinal load ("end load") applied along the longitudinal axis L2 exactly centered between the beams 224, 226, then both beams are placed into either tension or compression, equally, and due to the opposing polarities of the strain gauges 228, 230, the associated effects on the strain gauges 228, 230 are substantially canceled. Thus, end loads on the load cell 82 may be effectively ignored by the load cell 82. However, if the end load is offset vertically from the longitudinal axis L2, the associated effects on the strain gauges 228, 230 would not effectively cancel, but could be amplified due to the opposing polarities of the strain gauges 228, 230. Loads applied laterally, transverse to the longitudinal axis L2 (see "side load"), may also be undesirable and difficult to compensate for during measurements. These loads cause complex shear/tensile/compressive loading at the strain gauges 228, 230. Twisting of the load cell 82 about the longitudinal axis L2 is also undesirable and causes internal shear loading at the strain gauges 228, 230 in opposite directions in the beams 224, 226. Such twisting can also be difficult to compensate for during measurements and may cause inaccurate readings. For these reasons, it may be desirable to minimize side loads and twisting of the load cells 82.

Figure 23:
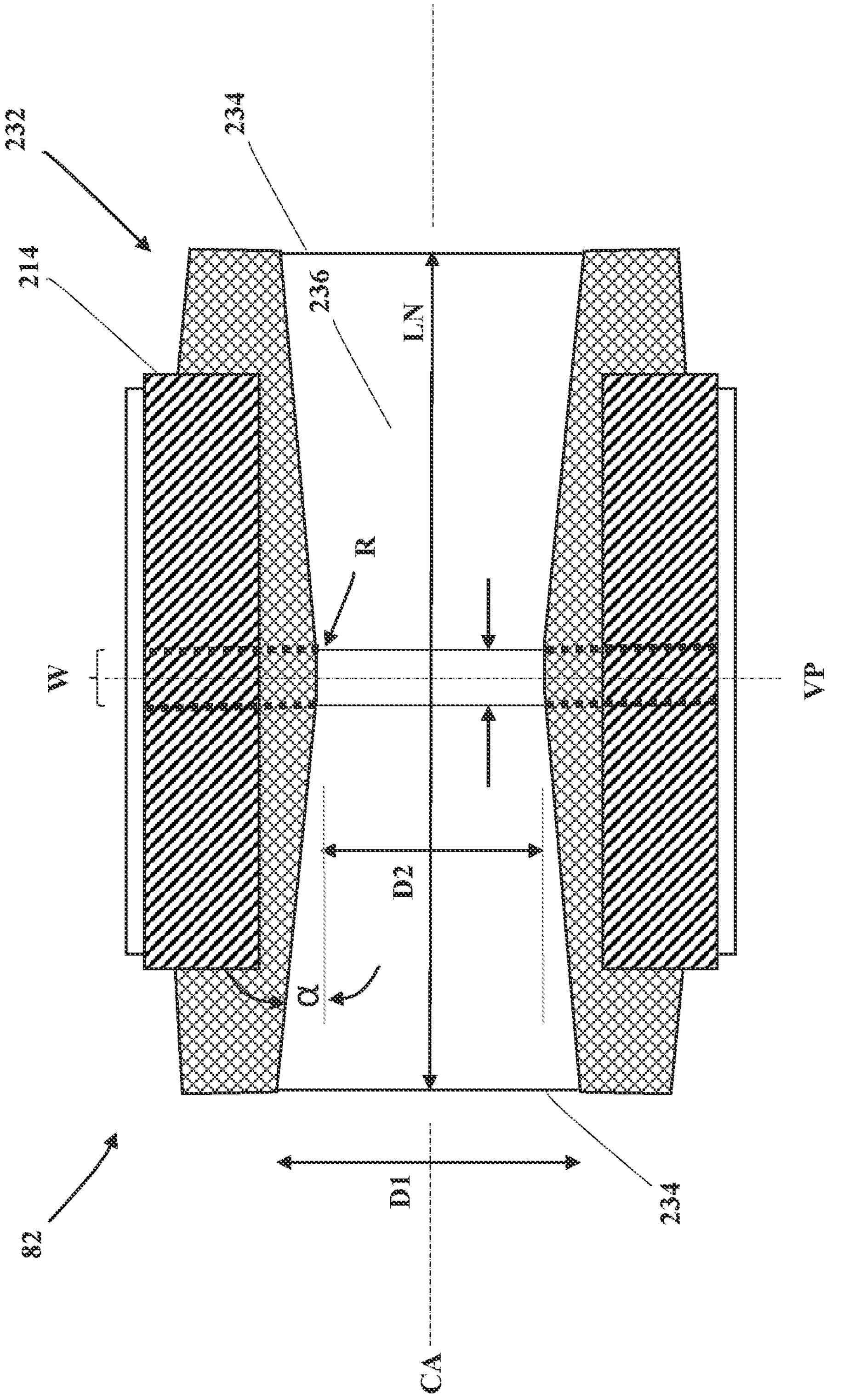
FIG. 23 is a cross-sectional view of the load cell of FIG. 18 taken generally along the line 23-23 in FIG. 18.

Referring to FIG. 23, the load cell 82 has a bushing 232 that is shaped and configured to minimize side loads and twisting of the load cell 82 and to focus application of loads to a small, load application region R. The bushing 232 defines a pair of side openings 234 and a pivot shaft passage 236 extending between the side openings 234. The pivot shaft passage 236 receives the pivot shaft 212. Each of the side openings 234 has a first diameter D1 and the pivot shaft passage 236 has a second diameter D2 in the load application region R. The second diameter D2 is smaller than the first diameter D1.

The load application region R is located midway through the pivot shaft passage 236 and has a width W of less than 50% of a length LN of the pivot shaft passage 236, less than 30% of the length LN of the pivot shaft passage 236, or less than 10% of the length LN of the pivot shaft passage 236. The load application region R defines a plane with the width W along which loads are concentrated. In some versions, the load application region R has a width W of less than 1.0 inches, less than 0.6 inches, less than 0.4 inches, or less than 0.3 inches. The elongate body 214 defines a vertical plane VP extending midway through the elongate body 214 and the vertical plane VP passes through a middle of the load application region R. Accordingly, the load application region R represents a relatively narrow region within the pivot shaft passage 236, that is centered in the pivot shaft passage 236, and at which loads are ideally applied to the load cell 82.

The pivot shaft passage 236 tapers down from the first diameter D1 at each of the pair of side openings 234 to the second diameter D2 at the load application region R. The taper may form an angle α of at least 3 degrees, at least 5 degrees, at least 10 degrees, or at least 15 degrees relative to a central axis CA of the pivot shaft passage 236. The taper between the side openings 234 and the load application region R provides free space to receive the pivot shaft 212 in the event that tilting of the pivot shaft 212 relative to the central axis CA occurs in the pivot shaft passage 236. This free space allows the pivot shaft 212 to tilt to at least a limited extent before causing twisting loads to be realized by the strain gauges 228, 230.

Figure 24:
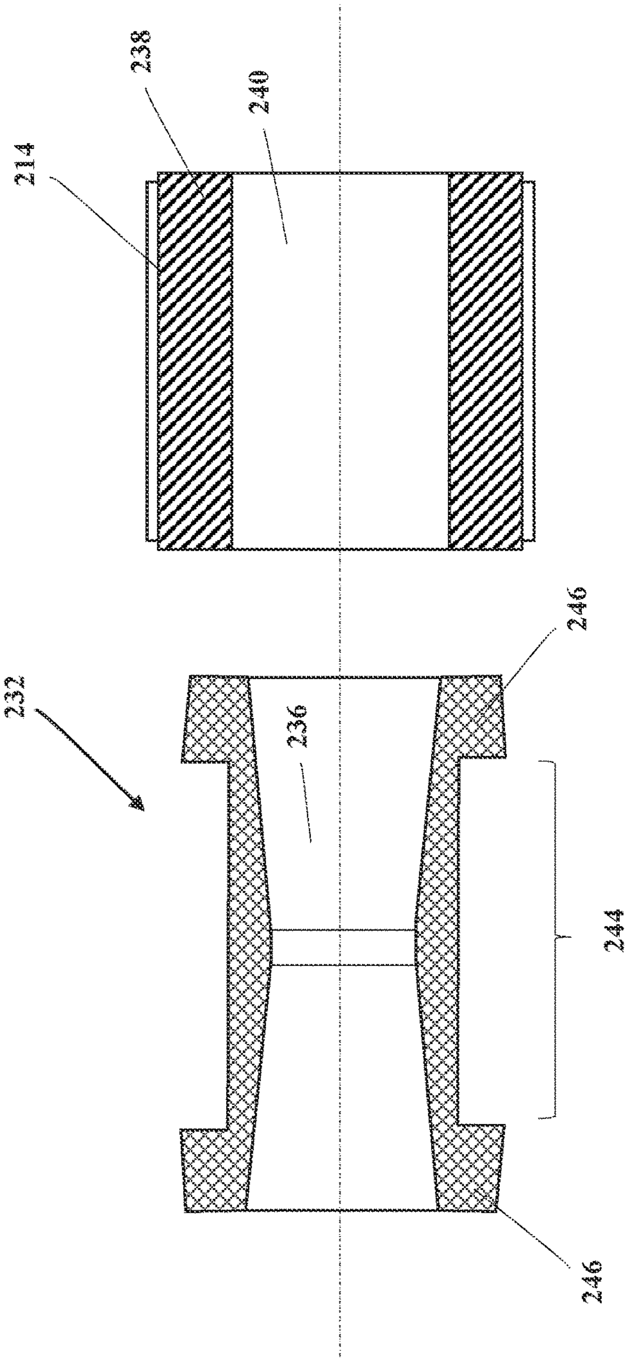
FIG. 24 is a partially exploded view of a bushing and a block of the load cell of FIG. 18.

Referring to FIG. 24, the elongate body 214 includes a block 238 and the bushing 232 is coupled to the block 238 to define the pivot shaft passage 236. The block 238 defines a throughbore 240 and the bushing 232 is located in the throughbore 240. The bushing 232 has a central bushing portion 244 and side bushing portions 246. The bushing 232 may be insert molded in the throughbore 240, press fit into the throughbore 240 (by first softening the bushing 232 and then inserting), formed in two pieces and fastened/adhered together in the throughbore 240, or otherwise disposed in the throughbore 240. The block 238 is formed at least partially of metal and the bushing 232 is formed at least partially of plastic. The bushing 232 may be formed at least partially of, and/or coated with, low friction and low wear materials, e.g., PTFE, to facilitate movement of the pivot shaft 212 in the bushing 232.

Figure 24A:
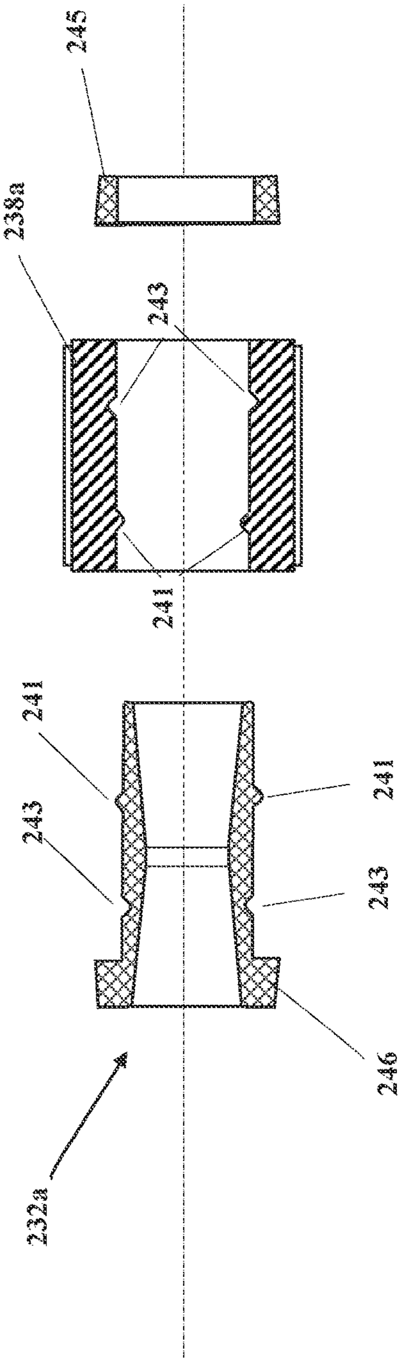
FIG. 24A is a partially exploded view of another bushing and another block of a load cell.

Referring to FIG. 24A, an alternative block 238*a* and bushing 232*a* is shown having interlocking features 241, 243 to facilitate connection. The interlocking features may include annular detent ribs 241 that fit within annual detent pockets 243. Other forms of snap-fit type connections are also contemplated. In some cases, there is a single set of such interlocking features, or there may be multiple sets (as shown). The bushing 232*a* may be additionally, or alternatively, press fit into the block 238*a*. In FIG. 24A, the bushing 232*a* is shown as being two-piece with a separate cap 245. The cap 245 may be attached about an end of the bushing 232*a* once the other piece of the bushing 232*a* is inserted through the block 238*a*. When the cap 245 is attached, the resulting bushing 232*a* resembles the bushing 232 shown in FIG. 24. The cap 245 may be attached via welding, fasteners, adhesive, and/or press-fit, or the like.

Figure 25A:
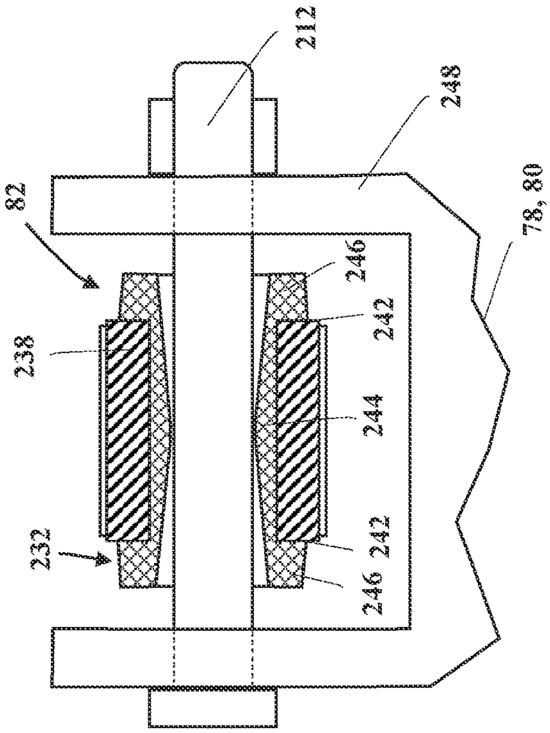
FIGS. 25A through 25C illustrate various positions of a pivot shaft in the bushing of the load cell.
Figure 25B:
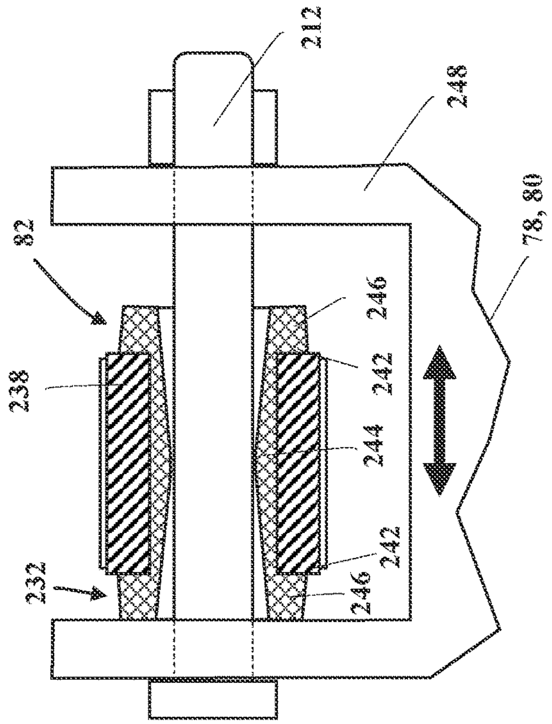
Figure 25C:
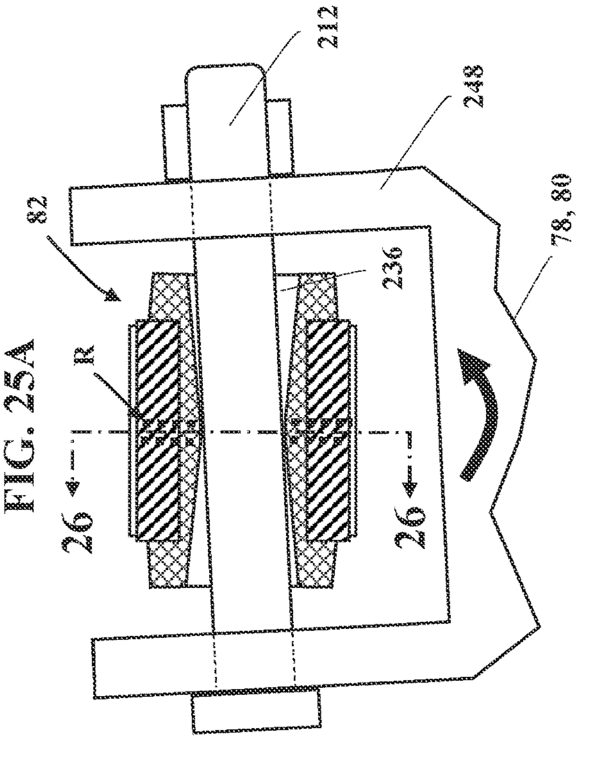

Referring to FIGS. 25A through 25C, the block 238 has sides 242 and the side bushing portions 246 extend from the sides 242 to abut and bear against a pivot bracket 248, e.g., such as a pivot bracket of the leg 78, 80 that is pivotally connected to the load cell 82 via the pivot shaft 212 (see FIG. 25B). FIG. 25C illustrates the effects of slight tilting of the pivot shaft 212 without causing corresponding twisting of the load cell 82—owing to the tapered shape of the pivot shaft passage 236. Accordingly, loads acting on the pivot shaft 212 are still largely applied in the load application region R and in the vertical direction and/or end direction.

In some arrangements of the load cells 82 previously described, the load cells 82 tilt with the support frame 36 during movement to the Trendelenburg positions (see, e.g., FIG. 4A). However, end loads that might otherwise occur during such tilting are minimized owing to the head end lift 72 (or foot end lift 74 in some versions) being configured to slide and compensate for such tilting movement via the guided bodies B1, B3, B4 and their translation along the base 34. The load cells 82, by virtue of being aligned longitudinally with respect to the support frame 36, further takes advantage of the load cells 82 being less sensitive to end loads.

Figure 26:
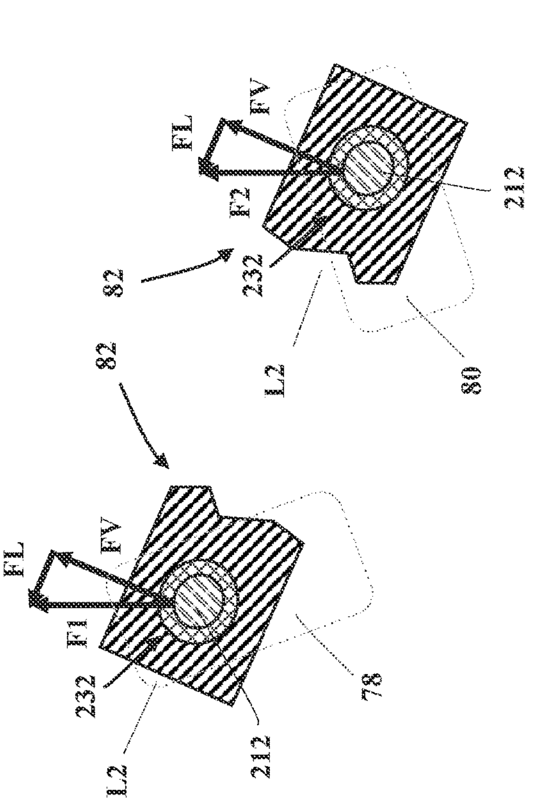
FIG. 26 is a cross-sectional view of two load cells of FIG. 18 taken generally along the line 26-26 in FIG. 25C. Note that the cross-section for one of the load cells is reversed from the direction shown in line 26-26.

FIG. 26 shows such tilting of two of the load cells 82 (one attached to a head end leg 78 and the other attached to a foot end leg 80). FIG. 26 illustrates the resulting application of loads F1, F2 acting on the load cells 82 through the pivot shafts 212. Due to the tilt of the load cells 82, the loads F1, F2 are applied at an angle to the longitudinal axis L2 of the load cells 82, but the loads F1, F2 are still applied along the plane defined by the load application region R for the reasons previously discussed. Each of the loads F1, F2 has a vertical component FV directed perpendicular to the longitudinal axis L2 and a longitudinal component FL directed parallel to the longitudinal axis L2. Since the application of the longitudinal components FL are not exactly along the longitudinal axis L2, there may be some non-canceling end loading effects on the strain gauges 228, 230 for each particular load cell 82. However, because the load cells 82 are placed in opposing orientations, the collective effects on the load cells 82 tend to cancel. As a result, the measured loads are substantially based on the vertical components FV of the loads F1, F2.

A simple correction can be applied to the measurements taken by each load cell 82 to determine the loads F1, F2. This correction is calculated by measuring the angle of the load cells 82 (e.g., the Trendelenburg angle can be measured via an accelerometer, gyroscope, tilt sensor, or other suitable means connected to the controller 200) and simply determining the loads F1, F2 based on a cosine function of the measured angle and applying the cosine function to the measured loads (e.g., FV). The correction factor is based on the relationship of: $L=W\cdot\cos(T)$, where: L is the collective measurement of the load; W is a total weight of the patient; and T is the Trendelenburg angle. See, for example, the correction algorithm and associated components described in U.S. patent application Ser. No. 16/549,612, entitled "Angle Calibration Using Load Cells," incorporated by reference herein. Such correction, however, would not be needed in the arrangement of load cells 82 shown in FIGS. 12 and 13, since the loads F1, F2 in that arrangement would be substantially applied in the vertical direction owing to the load cells 82 substantially maintaining their horizontal arrangement (+/−5 degrees) during tilting of the support frame 36 when moving the support frame 36 to one or more Trendelenburg positions.

Figure 27:
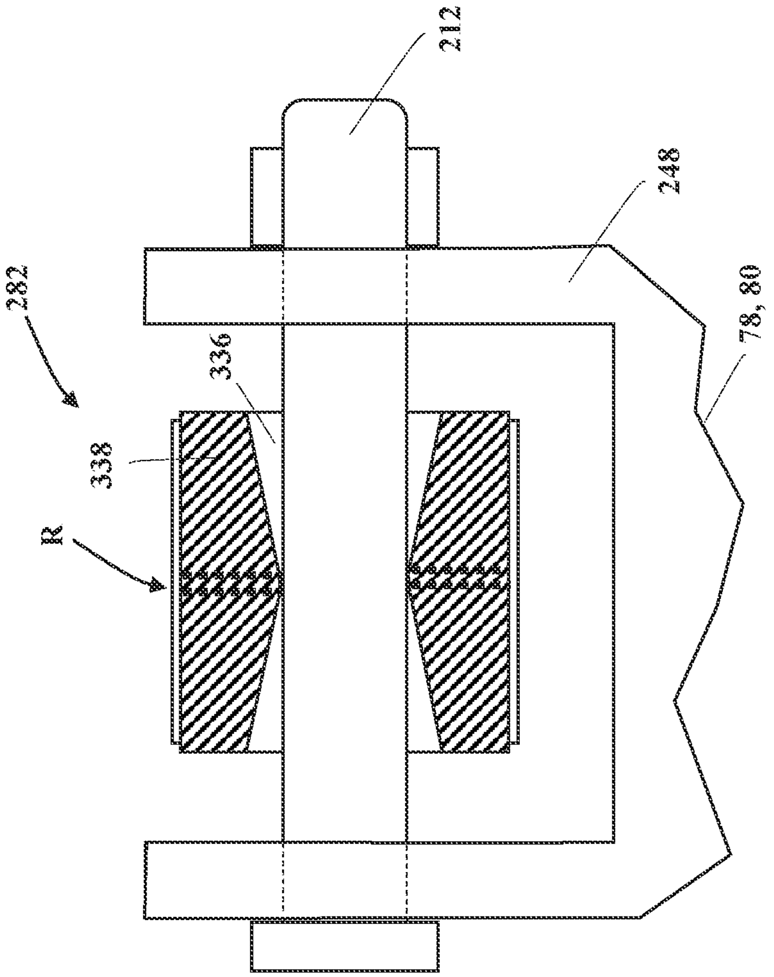
FIG. 27 is a cross-sectional view of another load cell.

FIG. 27 illustrates an version of a load cell 282 in which the block 338 of the load cell 282 is shaped to provide a tapered pivot shaft passage 336 like that provided by the bushing 232 described above to yield a small load application region R in which loads from the pivot shaft 212 can be concentrated.

Several versions have been discussed in the foregoing description. However, the versions discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A patient support apparatus comprising:

a support structure including a base, a support frame, and a patient support deck, the support frame extending longitudinally from a first longitudinal end to a second longitudinal end and the base having a guide;

a first lift to lift or lower the first longitudinal end of the support frame relative to the base, the first lift having a guided body movable longitudinally relative to the base along the guide;

a second lift to lift or lower the second longitudinal end of the support frame relative to the base, the first lift and the second lift being independently operable to place the support frame in one or more Trendelenburg positions in which the first longitudinal end and the second longitudinal end are at different heights relative to the base; and a plurality of load cells, with at least one load cell coupled to the first lift to act between the first lift and the support frame and at least one load cell coupled to the second lift to act between the second lift and the support frame such that a load on the support frame is transmitted to the plurality of load cells to measure the load, wherein the guided body is arranged to move longitudinally relative to the base in response to operation of the second lift to move the support frame to the one or more Trendelenburg positions such that the first lift moves longitudinally toward the second lift to accommodate movement of the support frame to the one or more Trendelenburg positions.

II. The patient support apparatus of clause I, wherein the first longitudinal end is further defined as one of a head end and a foot end and the second longitudinal end is further defined as the other of the head end and the foot end.

III. The patient support apparatus of clause II, wherein each of the plurality of load cells includes an elongate body extending longitudinally from a mounting portion to a load application portion.

IV. The patient support apparatus of clause III, wherein each of the plurality of load cells is arranged longitudinally between the head end and the foot end of the support frame.

V. The patient support apparatus of clause IV, wherein the at least one load cell coupled to the first lift is further defined as a first pair of load cells and the at least one load cell coupled to the second lift is further defined as a second pair of load cells.

VI. The patient support apparatus of clause V, wherein the first lift is pivotally connected to the load application portions of the first pair of load cells and the second lift is pivotally connected to the load application portions of the second pair of load cells, and wherein the mounting portions of the first pair of load cells are fixed to the support frame and the mounting portions of the second pair of load cells are fixed to the support frame.

VII. The patient support apparatus of any of clauses clause V-IV, wherein the mounting portions of the first pair of load cells are fixed to the first lift and the mounting portions of the second pair of load cells are fixed to the second lift, and wherein the load application portions of the first pair of load cells are pivotally connected to the support frame and load application portions of the second pair of load cells are pivotally connected to the support frame.

VIII. The patient support apparatus of any of clauses V-VII, wherein the first lift includes:

one or more first legs extending from the first pair of load cells to the base, wherein the one or more first legs are slidably coupled to the base to slide relative to the base;

one or more links pivotally connected to the one or more first legs and extending from the one or more first legs to the base; and a first actuator operably coupled to the one or more first legs and the one or more links, wherein the guided body is pivotally connected to the one or more links, the guided body being coupled to the base to translate longitudinally along the guide relative to the base during movement to the one or more Trendelenburg positions.

IX. The patient support apparatus of clause VIII, wherein the second lift includes:

one or more second legs extending from the second pair of load cells to the base, wherein the one or more second legs are slidably coupled to the base to slide relative to the base; and a second actuator operably coupled to the one or more second legs.

X. The patient support apparatus of any of clauses V-IX, wherein the first lift includes a first column lift extending from the first pair of load cells to the base and a first actuator to extend and retract the first column lift, wherein the first column lift is fixed from sliding relative to the base.

XI. The patient support apparatus of clause X, wherein the second lift includes a second column lift extending from the second pair of load cells to the base and a second actuator to extend and retract the second column lift, wherein the guided body supports the second column lift and is arranged to translate the second column lift longitudinally relative to the base during movement to the one or more Trendelenburg positions.

XII. The patient support apparatus of any of clauses V-XI, wherein the first pair of load cells are longitudinally aligned with the second pair of load cells and oriented such that the load application portions of the first pair of load cells face in an opposite direction relative to the load application portions of the second pair of load cells.

XIII. The patient support apparatus of any of clauses V-XII, wherein the first pair of load cells are longitudinally aligned with the second pair of load cells and oriented such that the load application portions of the first pair of load cells face in a common direction with the load application portions of the second pair of load cells.

XIV. The patient support apparatus of any of clauses V-XIII, wherein the first pair of load cells and the second pair of load cells are arranged to tilt with the support frame during movement of the support frame to the one or more Trendelenburg positions.

XV. The patient support apparatus of any of clauses V-XIV, wherein the first pair of load cells and the second pair of load cells are arranged to remain substantially horizontal during movement of the support frame to the one or more Trendelenburg positions.

XVI. The patient support apparatus of any of clauses I-XV, wherein the guided body is arranged to move longitudinally relative to the base in response to operation of the first lift to move the support frame to the one or more Trendelenburg positions.

XVII. The patient support apparatus of any of clauses I-XVI, comprising a plurality of side rails coupled to the support structure and a plurality of caster wheels coupled to the base.

XVIII. A load cell comprising:

an elongate body extending longitudinally along a longitudinal axis from a mounting portion to a load application portion, the load application portion defining a pair of side openings and a pivot shaft passage extending between the side openings with a load application region located midway through the pivot shaft passage, wherein each of the pair of side openings has a first diameter and the pivot shaft passage has a second diameter at the load application region, the second diameter being smaller than the first diameter.

XIX. The load cell of clause XVIII, wherein the pivot shaft passage tapers down from the first diameter at each of the pair of side openings to the second diameter at the load application region.

XX. The load cell of any of clauses XVIII-XIX, wherein the elongate body defines a plane extending midway through the elongate body and the plane passes through the load application region.

XXI. The load cell of any of clauses XVIII-XX, wherein the elongate body includes a block and a bushing coupled to the block to define the pivot shaft passage, the block being formed at least partially of metal and the bushing being formed at least partially of plastic.

XXII. The load cell of clause XXI, wherein the block defines a throughbore and the bushing is located in the throughbore.

XXIII The load cell of clause XXII, wherein the block has sides and the bushing has a central bushing portion located in the throughbore and side bushing portions extending from the sides.

XXIV. The load cell of any of clauses XVIII-XXIII, wherein the elongate body includes a pair of beams connecting the load application portion to the mounting portion.

XXV. The load cell of clause XXIV, including a pair of strain gauges coupled to the pair of beams.

XXVI. The load cell of clause XXV, wherein the beams and strain gauges are arranged so that the pair of strain gauges are more sensitive to loads being applied transverse to the longitudinal axis as compared to loads being applied along the longitudinal axis.

What is claimed is:

1. A patient support apparatus comprising:

a support structure including a base, a support frame, and a patient support deck, the support frame extending longitudinally from a first longitudinal end to a second longitudinal end and the base having a guide;

a first lift to lift or lower the first longitudinal end of the support frame relative to the base, the first lift having a guided body movable longitudinally relative to the base along the guide;

a second lift to lift or lower the second longitudinal end of the support frame relative to the base, the first lift and the second lift being independently operable to place the support frame in one or more Trendelenburg positions in which the first longitudinal end and the second longitudinal end are at different heights relative to the base; and a plurality of load cells, with at least one load cell coupled to the first lift to act between the first lift and the support frame and at least one load cell coupled to the second lift to act between the second lift and the support frame such that a load on the support frame is transmitted to the plurality of load cells to measure the load, wherein the guided body is arranged to move longitudinally relative to the base in response to operation of the second lift to move the support frame to the one or more Trendelenburg positions such that the first lift moves longitudinally toward the second lift to accommodate movement of the support frame to the one or more Trendelenburg positions.

2. The patient support apparatus of claim 1, wherein the first longitudinal end is further defined as one of a head end and a foot end and the second longitudinal end is further defined as the other of the head end and the foot end.

3. The patient support apparatus of claim 2, wherein each of the plurality of load cells includes an elongate body extending longitudinally from a mounting portion to a load application portion.

4. The patient support apparatus of claim 3, wherein each of the plurality of load cells is arranged longitudinally between the head end and the foot end of the support frame.

5. The patient support apparatus of claim 4, wherein the at least one load cell coupled to the first lift is further defined as a first pair of load cells and the at least one load cell coupled to the second lift is further defined as a second pair of load cells.

6. The patient support apparatus of claim 5, wherein the first lift is pivotally connected to the load application portions of the first pair of load cells and the second lift is pivotally connected to the load application portions of the second pair of load cells, and wherein the mounting portions of the first pair of load cells are fixed to the support frame and the mounting portions of the second pair of load cells are fixed to the support frame.

7. The patient support apparatus of claim 5, wherein the mounting portions of the first pair of load cells are fixed to the first lift and the mounting portions of the second pair of load cells are fixed to the second lift, and wherein the load application portions of the first pair of load cells are pivotally connected to the support frame and load application portions of the second pair of load cells are pivotally connected to the support frame.

8. The patient support apparatus of claim 5, wherein the first lift includes:

one or more first legs extending from the first pair of load cells to the base, wherein the one or more first legs are slidably coupled to the base to slide relative to the base;

one or more links pivotally connected to the one or more first legs and extending from the one or more first legs to the base; and a first actuator operably coupled to the one or more first legs and the one or more links, wherein the guided body is pivotally connected to the one or more links, the guided body being coupled to the base to translate longitudinally along the guide relative to the base during movement to the one or more Trendelenburg positions; and wherein the second lift includes:

one or more second legs extending from the second pair of load cells to the base, wherein the one or more second legs are slidably coupled to the base to slide relative to the base; and a second actuator operably coupled to the one or more second legs.

9. The patient support apparatus of claim 5, wherein the first pair of load cells are longitudinally aligned with the second pair of load cells and oriented such that the load application portions of the first pair of load cells face in an opposite direction relative to the load application portions of the second pair of load cells.

10. The patient support apparatus of claim 5, wherein the first pair of load cells are longitudinally aligned with the second pair of load cells and oriented such that the load application portions of the first pair of load cells face in a common direction with the load application portions of the second pair of load cells.

11. The patient support apparatus of claim 5, wherein the first pair of load cells and the second pair of load cells are arranged to tilt with the support frame during movement of the support frame to the one or more Trendelenburg positions.

12. The patient support apparatus of claim 5, wherein the first pair of load cells and the second pair of load cells are arranged to remain substantially horizontal during movement of the support frame to the one or more Trendelenburg positions.

13. The patient support apparatus of claim 1, wherein the guided body is arranged to move longitudinally relative to the base in response to operation of the first lift to move the support frame to the one or more Trendelenburg positions.

14. The patient support apparatus of claim 1, comprising a plurality of side rails coupled to the support structure and a plurality of caster wheels coupled to the base.

15. A load cell comprising:

an elongate body extending longitudinally along a longitudinal axis from a mounting portion to a load application portion, the load application portion defining a pair of side openings and a pivot shaft passage extending between the side openings with a load application region located midway through the pivot shaft passage, wherein each of the pair of side openings has a first diameter and the pivot shaft passage has a second diameter at the load application region, the second diameter being smaller than the first diameter; and wherein the pivot shaft passage tapers down from the first diameter at each of the pair of side openings to the second diameter at the load application region.

16. The load cell of claim 15, wherein the elongate body defines a plane extending midway through the elongate body and the plane passes through the load application region.

17. The load cell of claim 15, wherein the elongate body includes a block and a bushing coupled to the block to define the pivot shaft passage, the block being formed at least partially of metal and the bushing being formed at least partially of plastic;

wherein the block defines a throughbore and the bushing is located in the throughbore; and wherein the block has sides and the bushing has a central bushing portion located in the throughbore and side bushing portions extending from the sides.

18. The load cell of claim 15, wherein the elongate body includes a pair of beams connecting the load application portion to the mounting portion, with a pair of strain gauges coupled to the pair of beams; and wherein the beams and strain gauges are arranged so that the pair of strain gauges are more sensitive to loads being applied transverse to the longitudinal axis as compared to loads being applied along the longitudinal axis.

19. A load cell comprising:

an elongate body extending longitudinally along a longitudinal axis from a mounting portion to a load application portion, the load application portion defining a pair of side openings and a pivot shaft passage extending between the side openings with a load application region located midway through the pivot shaft passage, wherein each of the pair of side openings has a first diameter and the pivot shaft passage has a second diameter at the load application region, the second diameter being smaller than the first diameter;

wherein the elongate body includes a pair of beams connecting the load application portion to the mounting portion, with a pair of strain gauges coupled to the pair of beams; and wherein the beams and strain gauges are arranged so that the pair of strain gauges are more sensitive to loads being applied transverse to the longitudinal axis as compared to loads being applied along the longitudinal axis.

* * * * *